United States Patent
Muta et al.

(10) Patent No.: US 8,046,124 B2
(45) Date of Patent: Oct. 25, 2011

(54) CONTROL APPARATUS AND CONTROL METHOD FOR ELECTRIC VEHICLE

(75) Inventors: Koichiro Muta, Okazaki (JP); Ippei Nagao, Nagoya (JP)

(73) Assignees: Toyota Jidosha Kabushiki Kaisha, Toyota-shi (JP); Denso Corporation, Kariya (JP)

( * ) Notice: Subject to any disclaimer, the term of this patent is extended or adjusted under 35 U.S.C. 154(b) by 1231 days.

(21) Appl. No.: 11/706,357

(22) Filed: Feb. 15, 2007

(65) Prior Publication Data
US 2007/0187158 A1    Aug. 16, 2007

(30) Foreign Application Priority Data
Feb. 15, 2006   (JP) .................................. 2006-038322

(51) Int. Cl.
G05D 1/00 (2006.01)
G05D 3/00 (2006.01)
G06F 7/00 (2006.01)
G06F 17/00 (2006.01)
B60L 9/00 (2006.01)
B60L 11/00 (2006.01)

(52) U.S. Cl. ....................................................... 701/22

(58) Field of Classification Search .................. None
See application file for complete search history.

(56) References Cited

U.S. PATENT DOCUMENTS

| | | | | |
|---|---|---|---|---|
| 3,920,280 A * | 11/1975 | Luhdorff et al. | ......... | 303/122.06 |
| 4,538,100 A * | 8/1985 | Tuten et al. | ............ | 318/808 |
| 4,546,437 A * | 10/1985 | Bleckmann et al. | ............ | 701/70 |
| 5,306,990 A * | 4/1994 | Hofsass et al. | ................ | 318/434 |
| 5,327,056 A * | 7/1994 | Loreck et al. | ................ | 318/563 |
| 5,372,410 A * | 12/1994 | Miller et al. | ............ | 303/122.05 |
| 5,411,324 A * | 5/1995 | Zydek et al. | ............ | 303/122.05 |
| 5,433,512 A * | 7/1995 | Aoki et al. | ........................ | 303/3 |
| 5,583,406 A * | 12/1996 | Mutoh et al. | ................ | 318/376 |
| 5,638,247 A * | 6/1997 | Loreck et al. | ................ | 361/191 |
| 6,102,492 A * | 8/2000 | Diehle et al. | ................ | 303/113.5 |
| 6,107,696 A * | 8/2000 | Peter et al. | ........................ | 307/31 |
| 6,908,162 B2 * | 6/2005 | Obayashi et al. | ............ | 303/152 |
| 7,363,122 B2 * | 4/2008 | Bischoff | ........................ | 701/22 |
| 7,495,411 B2 * | 2/2009 | Kaneko et al. | ................ | 318/801 |
| 2005/0080523 A1* | 4/2005 | Bennett et al. | ................ | 701/22 |
| 2005/0119805 A1* | 6/2005 | Bischoff | ........................ | 701/22 |
| 2006/0237244 A1 | 10/2006 | Hommi | | |
| 2008/0258253 A1* | 10/2008 | Fey et al. | ........................ | 257/500 |

(Continued)

FOREIGN PATENT DOCUMENTS

JP    01-097102 A    4/1989
(Continued)

*Primary Examiner* — John Nguyen
*Assistant Examiner* — Nicholas Kiswanto
(74) *Attorney, Agent, or Firm* — Kenyon & Kenyon LLP

(57) ABSTRACT

A control apparatus for an electric vehicle includes a road surface condition detection portion, a slip determination portion, a torque reduction device, and a voltage control device. The electric vehicle includes a motor that generates drive power for the electric vehicle, and a drive device that drives the motor. The road surface condition detection portion detects the condition of a road surface on which the electric vehicle is driven. The slip determination portion determines whether the electric vehicle is slipping. The torque reduction device reduces the torque of the motor when the slip determination portion determines that the electric vehicle is slipping. The voltage control device controls a voltage input to the drive device to reduce the voltage when the road surface condition detection portion determines that the road surface has a friction coefficient lower than a predetermined value.

20 Claims, 16 Drawing Sheets

U.S. PATENT DOCUMENTS

2010/0066282 A1 * 3/2010 Hahle et al. .................. 318/380

FOREIGN PATENT DOCUMENTS

| JP | 09-205701 A | 8/1997 |
| JP | 2000-270409 A | 9/2000 |
| JP | 2003-111207 A | 4/2003 |
| JP | 2005051850 A * | 2/2005 |
| JP | A2005-51850 | 2/2005 |
| JP | 2005-124287 A | 5/2005 |
| WO | PCT/JP2004/011184 * | 10/2005 |

* cited by examiner

CONTROL APPARATUS AND CONTROL METHOD FOR ELECTRIC VEHICLE

INCORPORATION BY REFERENCE

The disclosure of Japanese Patent Application No. 2006-038322 filed on Feb. 15, 2006 including the specification, drawings and abstract is incorporated herein by reference in its entirety.

BACKGROUND OF THE INVENTION

1. Field of the Invention

The invention relates to a control apparatus and a control method for an electric vehicle. More particularly, the invention relates to a control technology that avoids an overvoltage which is caused by reducing the torque of a motor when a vehicle slips.

2. Description of the Related Art

Japanese Patent Application Publication No. 2005-51850 (JP-A-2005-51850) describes a vehicle in which an overcurrent is prevented from flowing in a motor that outputs power to a drive shaft when the vehicle slips. The vehicle includes a boost converter that boosts a voltage output from a battery; and the motor that receives electric power from the boost converter and outputs the power to the drive shaft of the vehicle. In this vehicle, when it is determined that the vehicle is slipping due to idling of drive wheels, the motor is controlled to limit the torque output to the drive shaft. An initial torque value is set based on the degree of torque limitation. When the vehicle has stopped slipping, the motor is controlled to release the torque limitation and increase the torque to the set initial torque value.

In the vehicle, when the motor is controlled to release the torque limitation, the boost converter stably boosts the voltage, regardless of the degree of torque limitation. Thus, electric power can be stably supplied to the motor when the vehicle slips.

However, if the torque output to the drive shaft is rapidly limited when the vehicle slips, the amount of electric power consumed by the motor is sharply reduced. This may cause an overvoltage. The above-described Japanese Patent Application Publication No. 2005-51850 does not describe a preventative measure for an overvoltage.

SUMMARY OF THE INVENTION

The invention provides a control apparatus and a control method for an electric vehicle, which avoid an overvoltage caused by limiting the torque of a motor when the vehicle slips.

According to a first aspect of the invention, an electric vehicle includes a motor that generates drive power for the electric vehicle, and a drive device that drives the motor. A control apparatus for the electric vehicle includes a road surface condition detection portion, a slip determination portion, a torque reduction device, and a voltage control device. The road surface condition detection portion detects the condition of a road surface on which the electric vehicle is driven. The slip determination portion determines whether the electric vehicle is slipping. The torque reduction device reduces the torque of the motor when the slip determination portion determines that the electric vehicle is slipping. The voltage control device controls a voltage input to the drive device to reduce the voltage when the road surface condition detection portion determines that the road surface has a friction coefficient lower than a predetermined value.

The voltage control device may include a boost converter and a converter control portion. The boost converter generates the voltage input to the drive device by boosting a voltage supplied from an electric storage device according to an instruction provided to the boost converter. The converter control portion outputs, to the boost converter, an instruction for reducing a rate at which the boost converter boosts the voltage, when the road surface condition detection portion determines that the road surface has a friction coefficient lower than the predetermined value.

The converter control portion may output, to the boost converter, an instruction for stopping the boost converter from boosting the voltage, when the road surface condition detection portion determines that the road surface has a friction coefficient lower than the predetermined value.

The electric vehicle may further include a power generation device that generates electric power and supplies the generated electric power to the drive device. The control apparatus may further include a power generation control device that controls the power generation device to reduce an amount of electric power generated by the power generation device, when the slip determination portion determines that the electric vehicle is slipping.

The power generation control device may control the power generation device to increase the amount of electric power generated by the power generation device, when the road surface condition detection portion determines that the road surface has a friction coefficient lower than the predetermined value.

When the slip determination portion determines that the electric vehicle is slipping, the torque reduction device may reduce the torque of the motor at a rate that is lower than a rate while no slipping is determined by the slip determination portion.

The electric vehicle may further include an auxiliary machine that is driven using the electric power generated by the power generation device. The control apparatus may further include an auxiliary machine control device that controls the auxiliary machine to increase an amount of electric power consumed by the auxiliary machine, when the slip determination portion determines that the electric vehicle is slipping.

The electric vehicle may further include an auxiliary machine that is connected to a drive shaft of the vehicle, and driven by the drive shaft. The control apparatus may further include an auxiliary machine control device that controls the auxiliary machine to increase an amount of load applied by the auxiliary machine, when the slip determination portion determines that the electric vehicle is slipping.

In the above-described aspect, when the slip determination portion determines that the electric vehicle is slipping, the torque reduction device reduces the torque of the motor so that the electric vehicle stops slipping. If the torque of the motor is sharply reduced, the amount of electric power consumed by the motor is reduced. This may increase the voltage input to the drive device that drives the motor. However, in the above-described aspect, when the road surface condition detection portion, which detects the condition of the road surface, determines that the road surface has a friction coefficient lower than the predetermined value, the voltage control device controls the voltage input to the drive device, which drives the motor, to reduce the voltage. That is, when it is determined that the road surface has a friction coefficient lower than the predetermined value, the voltage input to the drive device is reduced in advance before the electric vehicle actually slips.

Accordingly, in the above-described aspect, although the torque of the motor is reduced when the electric vehicle slips, the voltage input to the drive device is prevented from becoming excessively high.

In the above-described aspect, when the slip determination portion determines that the electric vehicle is slipping, the power generation control device controls the power generation device to reduce the amount of electric power generated by the power generation device. This suppresses an increase in the voltage input to the drive device when the electric vehicle actually slips.

Accordingly, in the above-described aspect, it is possible to more reliably prevent an excessive voltage input to the drive device.

In the above-described aspect, when it is determined that the road surface has a friction coefficient lower than the predetermined value, the power generation control device controls the power generation device to increase the amount of electric power generated by the power generation device. Therefore, the amount of electric power generated by the power generation device can be reliably reduced when the electric vehicle slips.

Accordingly, in the above-described aspect, it is possible to more reliably prevent an excessive voltage input to the drive device.

In the above-described aspect, when the slip determination portion determines that the electric vehicle is slipping, the torque reduction device reduces the torque of the motor at a rate that is lower than a rate while no slipping is determined by the slip determination portion. This prevents a sharp reduction in the amount of electric power consumed by the motor when the electric vehicle slips.

Accordingly, in the above-described aspect, it is possible to prevent a sharp change in the balance between the amount of electric power generated by the power generation device and the amount of electric power consumed by the motor. This reliably prevents an excessive voltage input to the drive device.

In the above-described aspect, when the slip determination portion determines that the electric vehicle is slipping, the auxiliary machine control device controls the auxiliary machine to increase the amount of electric power consumed by the auxiliary machine that is driven using the electric power generated by the power generation device. Therefore, although the amount of electric power consumed by the motor is reduced due to the reduction of the torque of the motor when the electric vehicle slips, it is possible to prevent a sharp change in the balance between the amount of generated electric power and the amount of consumed electric power.

Accordingly, in the above-described aspect, it is possible to reliably prevent an excessive voltage input to the drive device when the electric vehicle slips.

In the above-described aspect, when the slip determination portion determines that the electric vehicle is slipping, the auxiliary machine control device controls the auxiliary machine, which is connected to the drive shaft of the vehicle and driven by the drive shaft, to increase the amount of load applied by the auxiliary machine. Therefore, when the electric vehicle slips, it is possible to reduce the amount by which the torque of the motor is reduced, while reducing the torque transmitted to the drive wheels. That is, when the electric vehicle slips, it is possible to reduce the amount by which the amount of electric power consumed by the motor is reduced. This prevents a sharp change in the balance between the amount of electric power generated by the power generation device and the amount of electric power consumed by the motor.

Accordingly, in the above-described aspect, it is possible to reliably prevent an excessive voltage input to the drive device when the electric vehicle slips.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Figure 1:
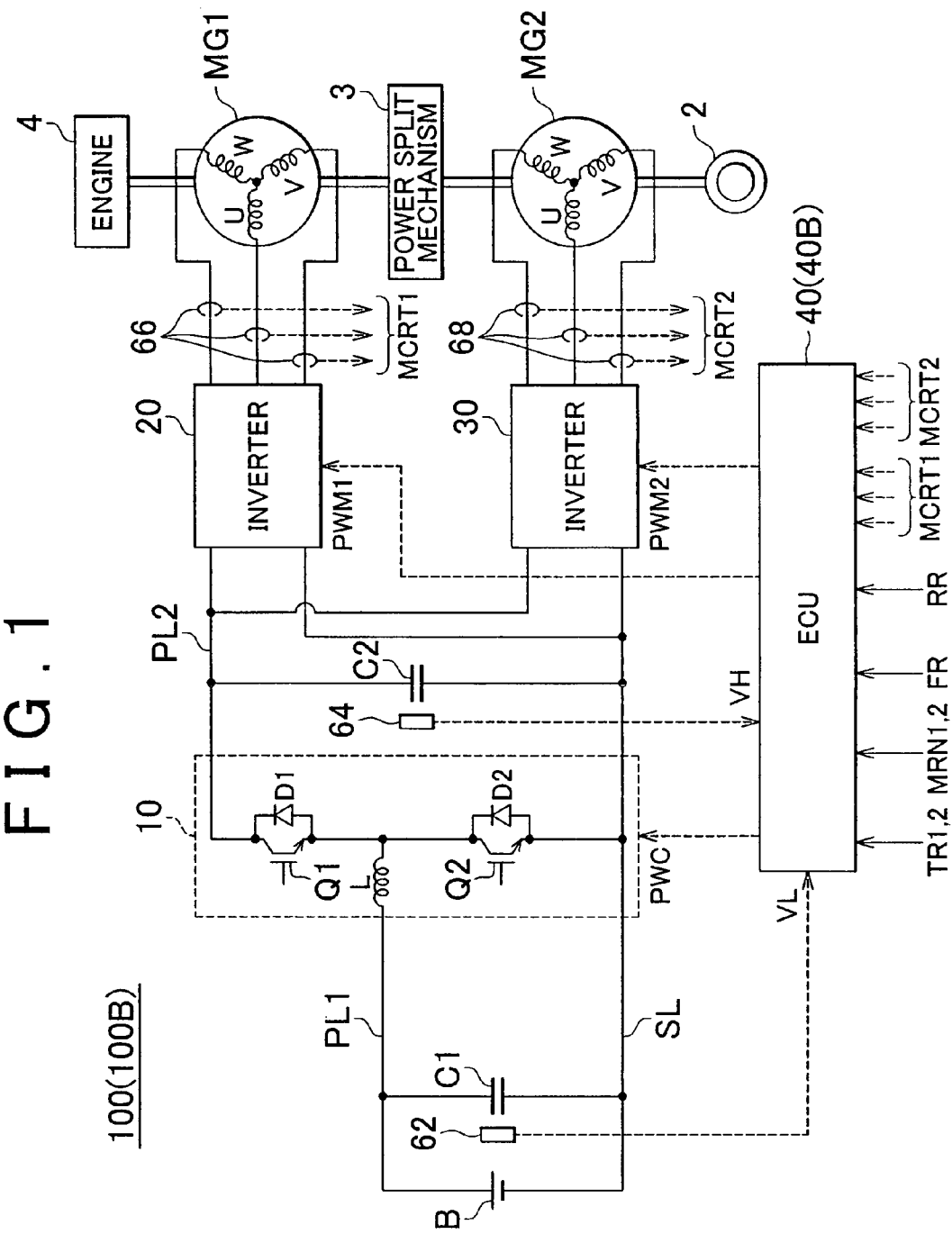
FIG. 1 is a schematic block diagram showing a hybrid vehicle that is an example of an electric vehicle provided with a control apparatus according to a first embodiment of the invention.

Hereinafter, embodiments of the invention will be described in detail with reference to the drawings. The same or corresponding components in the drawings are denoted by the same reference numerals, and the redundant description thereof will be omitted.

FIG. 1 is a schematic block diagram of a hybrid vehicle that is an example of an electric vehicle provided with a control apparatus according to a first embodiment of the invention. As shown in FIG. 1, the hybrid vehicle 100 includes drive wheels 2, a power split mechanism 3, an engine 4, and motor-generators MG1 and MG2. The hybrid vehicle 100 further includes an electric storage device B, a boost converter 10, inverters 20 and 30, an electronic control unit (hereinafter, referred to as "ECU") 40, capacitors C1 and C2, power source lines PL1 and PL2, a ground line SL, voltage sensors 62 and 64, and current sensors 66 and 68.

The power split mechanism 3 is connected to the engine 4 and the motor-generators MG1 and MG2 to distribute power to the engine 4 and the motor-generators MG1 and MG2. For example, a planetary gear mechanism, which includes three rotation shafts of a sun gear, a planetary carrier, and a ring gear, may be used as the power split mechanism 3. The three rotation shafts are connected to the rotation shafts of the engine 4, and the motor-generators MG1 and MG2, respectively. For example, by passing a crankshaft of the engine 4 through the center of a hollow rotor of the motor-generator MG1, the power split mechanism 3 can be mechanically connected to the engine 4, and the motor-generators MG1 and MG2.

The rotation shaft of the motor-generator MG2 is connected to the drive wheels 2 by a reduction gear (not shown) and an operating gear (not shown). A reducer that reduces the rotation speed of the rotation shaft of the motor-generator MG2 may be provided in the power split mechanism 3.

The motor-generator MG1 operates as a generator driven by the engine 4, and also as a motor that can start the engine 4. The motor-generator MG1 is provided in the hybrid vehicle 100. The motor-generator MG2 operates as a motor that drives the drive wheels 2. The motor-generator MG2 is provided in the hybrid vehicle 100.

The electric storage device B is a chargeable/dischargeable DC power source. For example, the electric storage device B may include a secondary battery such as a nickel-hydrogen battery or a lithium ion battery. The electric storage device B supplies DC electric power to the power source line PL1. The electric storage device B is charged with the DC electric power output from the boost converter 10 to the power source line PL1. A capacitor with a large capacity may be used as the electric storage device B.

The capacitor C1 smoothes voltage fluctuations between the power source line PL1 and the ground line SL. The voltage sensor 62 detects a voltage VL between both ends of the capacitor C1, and outputs a signal indicating the detected voltage VL to the ECU 40.

The boost converter 10 includes n-p-n transistors Q1 and Q2, diodes D1 and D2, and a reactor L. For example, the n-p-n transistors Q1 and Q2 may be IGBTs (Insulated Gate Bipolar Transistors). Power switching elements such as power MOSFETs (Metal Oxide Semiconductor Field-Effect Transistors) may be used, instead of the n-p-n transistors.

The n-p-n transistors Q1 and Q2 are connected to each other in series between the power source line PL2 and the ground line SL. The diodes D1 and D2 are connected in inverse-parallel to the n-p-n transistors Q1 and Q2, respectively. The reactor L is provided between the power source line PL1 and the point at which the n-p-n transistors Q1 and Q2 are connected to each other.

The boost converter 10 boosts the voltage of the power source line PL1, and outputs the boosted voltage to the power source line PL2, based on a signal PWC output from the ECU 40. More specifically, in the boost converter 10, electric current is stored in the reactor L as magnetic field energy when the n-p-n transistor Q2 is ON, and the stored energy is discharged from the reactor L to the power source line PL2 via the diode D1 when the n-p-n transistor Q2 is OFF. Thus, the boost converter 10 boosts the voltage of the power source line PL1.

By increasing the duty ratio of the n-p-n transistor Q2, the amount of electric power stored in the reactor L is increased, and therefore, the voltage output from the boost converter 10 is increased. By increasing the duty ratio of the n-p-n transistor Q1, the voltage of the power source line PL2 is reduced. Thus, by controlling the duty ratios of the n-p-n transistors Q1 and Q2, the voltage of the power source line PL2 can be controlled to any value that is equal to or higher than the voltage of the power source line PL1.

The capacitor C2 smoothes the voltage fluctuations between the power source line PL2 and the ground line SL. The voltage sensor 64 detects a voltage VH between both ends of the capacitor C2, and outputs a signal indicating the detected voltage VH to the ECU 40.

The inverters 20 and 30 are provided for the motor-generators MG1 and MG2, respectively. The inverter 20 converts three-phase AC electric power, which is generated by the motor-generator MG1 using power supplied from the engine 4, to DC electric power based on a signal PWM1 output from the ECU 40. Then, the inverter 20 supplies the DC power to the power source line PL2. When the engine 4 starts, the inverter 20 converts the DC electric power, which is supplied from the power source line PL2, to the three-phase AC electric power to drive the motor-generator MG1, based on the signal PWM1 output from the ECU 40.

The inverter 30 converts the DC electric power, which is supplied from the power source line PL2, to the three-phase AC electric power to drive the motor-generator MG2, based on a signal PWM2 output from the ECU 40. Thus, the motor-generator MG2 is driven to generate torque designated by a torque command value. When a regenerative brake is applied to the vehicle, the inverter 30 converts the three-phase AC electric power, which is generated by the motor-generator MG2 using the turning force received from the drive wheels 2, to the DC electric power, based on the signal PWM2 output from the ECU 40. Then, the inverter 30 outputs the DC electric power to the power source line PL2.

The motor-generators MG1 and MG2 are three-phase AC motors. For example, the motor-generators MG1 and MG2 may be three-phase AC synchronous motors. The motor-generator MG1 generates the three-phase AC electric power using the power supplied from the engine 4, and outputs the generated three-phase AC electric power to the inverter 20. Also, the motor-generator MG1 generates drive power using the three-phase AC electric power received from the inverter 20, thereby starting the engine 4. The motor-generator MG2 generates drive torque for driving the drive wheels 2, using the three-phase AC electric power received from the inverter 30. When a regenerative brake is applied to the vehicle, the motor-generator MG2 generates the three-phase AC electric power using the turning force received from the drive wheels 2, and outputs the generated three-phase AC electric power to the inverter 30.

The current sensor 66 detects a motor current MCRT1 flowing in the motor-generator MG1, and outputs a signal indicating the detected motor current MCRT1 to the ECU 40. The current sensor 68 detects a motor current MCRT2 flowing in the motor-generator MG2, and outputs a signal indicating the motor current MCRT2 to the ECU 40.

The ECU 40 receives the signal indicating the voltage VL and the signal indicating the voltage VH from the voltage sensors 62 and 64, respectively. The ECU 40 receives the signal indicating the motor current MCRT1 and the signal indicating the motor current MCRT2 from the current sensors 66 and 68, respectively. The ECU 40 also receives signals indicating torque command values TR1 and TR2, and motor rotation speeds MRN1 and MRN2, from an external ECU (not shown).

Based on these signals, the ECU 40 generates the signals PWC, PWM1, and PWM2 for driving the boost converter 10, and the motor-generators MG1 and MG2, respectively. Then, the ECU 40 outputs the generated signals PWC, PWM1, and PWM2 to the boost converter 10, and the inverters 20 and 30, respectively.

Further, the ECU 40 receives a signal indicating a rotation speed FR of the front wheels, that is, the drive wheels 2, and a rotation speed RR of the rear wheels (driven wheels) (not shown), from the external ECU. Based on the signals and the torque command values TR1 and TR2, the ECU 40 detects the condition of a road surface using a method described later. When the ECU 40 determines that the road surface has a low friction coefficient (that is, the road surface has a low $\mu$ value. The low friction coefficient means that the friction coefficient is lower than a predetermined value), the ECU 40 generates the signal PWC for driving the boost converter 10 to reduce the voltage of the power source line PL2 (i.e., the voltage VH).

Further, the ECU 40 determines whether the vehicle is slipping based on the rotation speeds FR and RR, using a method described later. When the ECU 40 determines that the vehicle is slipping, the ECU 40 generates the signal PWM2 for driving the motor-generator MG2 to reduce the torque of the motor-generator MG2.

Figure 2:
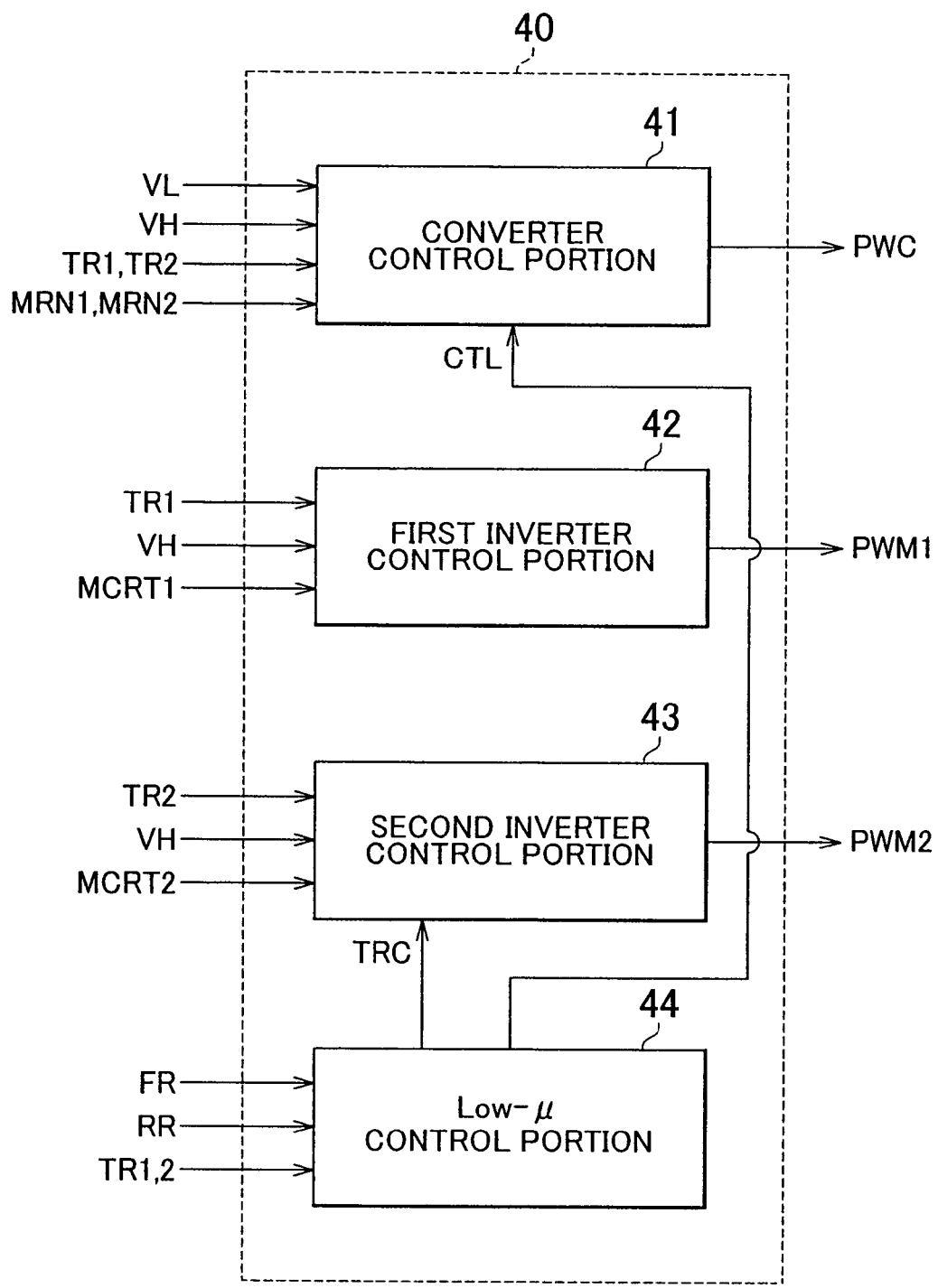
FIG. 2 is a functional block diagram of an ECU shown in FIG. 1.

FIG. 2 is a functional block diagram of the ECU 40 shown in FIG. 1. As shown in FIG. 2, the ECU 40 includes a converter control portion 41, first and second inverter control portions 42 and 43, and a low-$\mu$ control portion 44.

The converter control portion 41 calculates a voltage command value for the power source line PL2, based on the torque command values TR1 and TR2, and the motor speeds MRN1 and MRN2. Based on the calculated voltage command value, and the voltages VL and VH, the converter control portion 41 calculates a feedback voltage command value. Based on the feedback voltage command value, the converter control portion 41 calculates duty ratios for the n-p-n transistors Q1 and Q2. Based on the calculated duty ratios, the converter control portion 41 generates a PMW (Pulse Width Modulation) signal for turning the n-p-n transistors Q1 and Q2 on/off. Then, the converter control portion 41 outputs the generated PMW signal to the boost converter 10 as the signal PWC.

When a control signal CTL output from the low-$\mu$ control portion 44 is activated, the converter control portion 41 reduces the voltage command value for the power source line PL2 to reduce the rate at which the boost converter 10 boosts the voltage. Then, the converter control portion 41 generates the signal PWC using the reduced voltage command value.

When the control signal CTL is activated, the converter control portion 41 may generate the signal PWC that stops the boost-converter 10 from boosting the voltage. More specifically, when the control signal CTL is activated, the converter control portion 41 may generate the signal PWC that constantly turns the n-p-n transistor Q1 on, and constantly turns the n-p-n transistor Q2 off in the boost converter 10.

As described later, the control signal CTL is a signal that is activated when the low-$\mu$ control portion 44 determines that the road surface has a low p value.

The first inverter control portion 42 generates a PWM signal for driving the motor-generator MG1, based on the torque command value TR1, the voltage VH, and the motor current MCRT1. Then, the first inverter control portion 42 outputs the PWM signal to the inverter 20 as the signal PWM1.

The second inverter control portion 43 generates the PWM signal for driving the motor-generator MG2, based on the torque command value TR2, the voltage VH, and the motor current MCRT2. The second inverter control portion 43 outputs the generated PWM signal to the inverter 30 as the signal PWM2.

When a traction control flag TRC output from the low-$\mu$ control portion 44 is activated, the second inverter control portion 43 reduces the torque command value TR2 to reduce the torque of the motor-generator MG2. Then, the second inverter control portion 43 generates the signal PWM2 using the reduced torque command value.

As described later, the traction control flag TRC is a signal that is activated when the low-$\mu$ control portion 44 determines that the vehicle is slipping.

The low-$\mu$ control portion 44 detects the condition of the road surface based on the rotation speeds FR and RR, and the torque command values TR1 and TR2. Various methods for detecting the condition of the road surface are known. For example, the low-$\mu$ control portion 44 may calculate the slip ratio of the drive wheels using the rotation speeds FR and RR. In addition, the low-$\mu$ control portion 44 may calculate the drive power for the vehicle using the torque command values TR1 and TR2, and may determine whether the road surface has a high friction coefficient (i.e., a high $\mu$ value) or a low friction coefficient (i.e., a low $\mu$ value), using, for example, a preset map showing the relation between the drive power and the slip ratio. Other known methods for detecting the condition of the road surface may be employed.

When the low-$\mu$ control portion 44 determines that the road surface has a low $\mu$ value, the low-$\mu$ control portion 44 activates a low-$\mu$ determination flag, and activates the control signal CTL to be output to the converter control portion 41 in accordance with the activation of the low-$\mu$ determination flag.

The low-$\mu$ control portion 44 determines whether the vehicle is slipping based on the slip ratio of the drive wheels, which is calculated using the rotation speeds FR and RR. More specifically, when the calculated slip ratio is larger than a predetermined threshold value, the low-$\mu$ control portion 44 determines that the vehicle is slipping. When the low-$\mu$ control portion 44 determines that the vehicle is slipping, the low-$\mu$ control portion 44 activates the traction control flag TRC.

Figure 3:
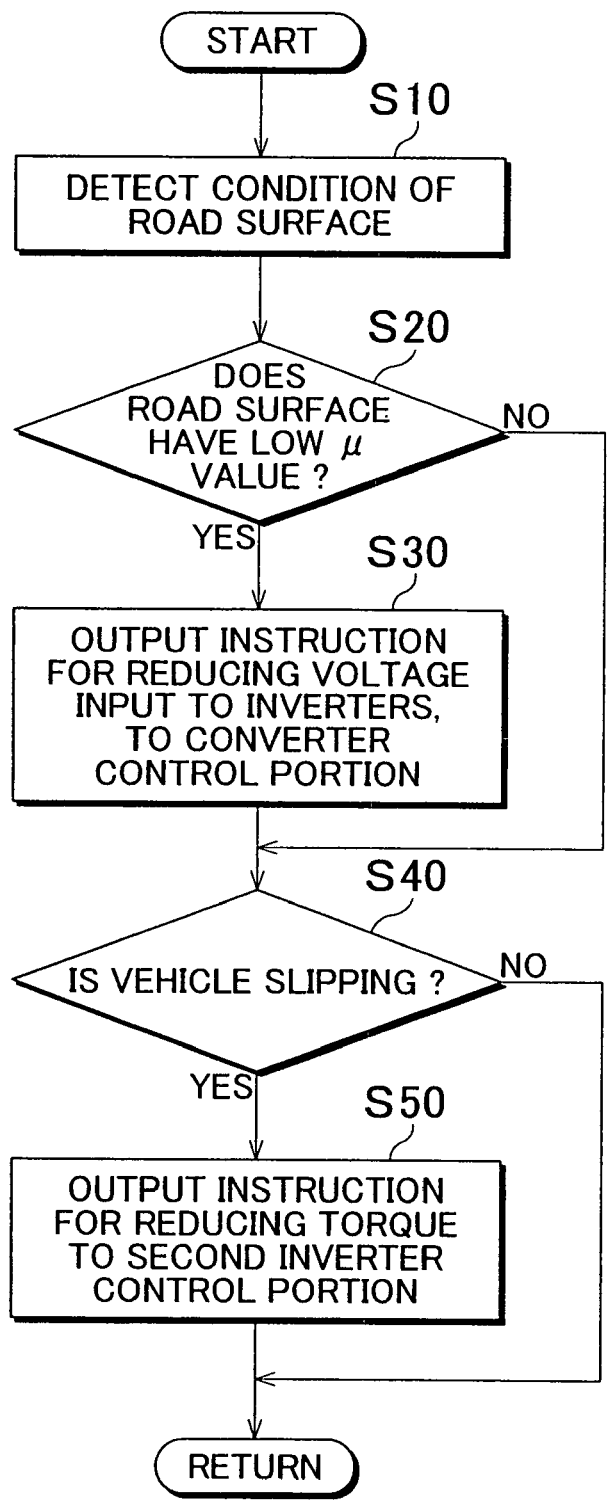
FIG. 3 is a flowchart showing the structure of a control executed by a low-μ control portion shown in FIG. 2.

FIG. 3 is a flowchart showing the structure of a control executed by the low-$\mu$ control portion 44 shown in FIG. 2. The routine shown by the flowchart is invoked from a main routine and executed at regular time intervals, or each time a predetermined condition is satisfied.

As shown in FIG. 3, the low-$\mu$ control portion 44 detects the condition of the road surface based on the rotation speeds FR and RR, and the torque command values TR1 and TR2 (step S10), and determines whether the road surface has a low $\mu$ value (step S20). When the low-$\mu$ control portion 44 determines that the road surface has a low $\mu$ value (YES in step S20), the low-$\mu$ control portion 44 activates the low-$\mu$ determination flag. Then, the low-$\mu$ control portion 44 activates the control signal CTL in accordance with the activation of the low-$\mu$ activation flag, and outputs an instruction for reducing the voltage input to the inverters 20 and 30 (i.e., the voltage VH) to the converter control portion 41 (step S30). When the low-$\mu$ control portion 44 determines that the road surface does not have a low $\mu$ value (NO in step S20), the low-$\mu$ control portion 44 performs the process in step S40 without performing the process in step S30.

Next, the low-$\mu$ control portion 44 determines whether the vehicle is slipping based on the rotation speeds FR and RR (step S40). When the low-μ control portion 44 determines that the vehicle is slipping (YES in step S40), the low-μ control portion 44 activates the traction control flag TRC, and outputs an instruction for reducing the torque of the motor-generator MG2 to the second inverter control portion 43 (step S50). When the low-μ control portion 44 determines that the vehicle is not slipping (NO in step S40), the low-μ control portion 44 finishes the routine, without performing the process in step S50.

Though it is not illustrated in FIG. 3, if it is determined that the road surface does not have a low-μ value (NO in step S20) while the instruction for reducing the voltage input to the inverters 20 and 30 (i.e., the voltage VH) is output to the converter control portion 41, the instruction is cancelled. Similarly, if it is determined that the vehicle has stopped slipping (NO in step S40) while the instruction for reducing the torque of the motor-generator MG2 is output to the second inverter control portion 43, the instruction is cancelled.

Figure 4:
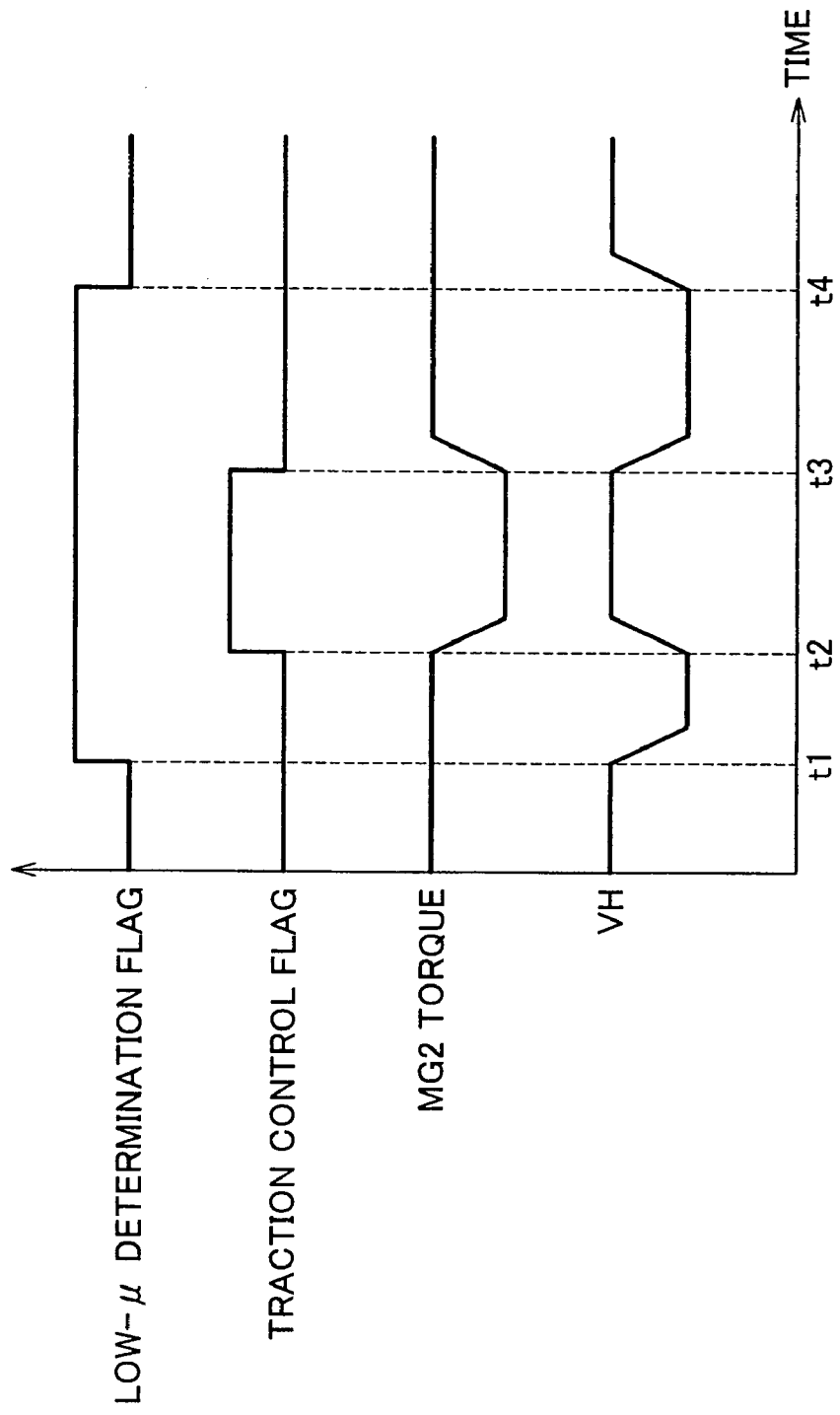
FIG. 4 is a timing chart of main signals and the like in the first embodiment.

FIG. 4 is a timing chart of main signals and the like in the first embodiment. As shown in FIG. 4, the low-μ control portion 44 determines that the road surface has a low μ value and activates the low-μ determination flag at time point t1. Accordingly, the control signal CTL output to the converter control portion 41 is activated, and the converter control portion 41 reduces the voltage command value for the power source line PL2. As a result, the voltage VH is reduced.

At time point t2, the low-μ control portion 44 determines that the vehicle is slipping and activates the traction control flag TRC. Accordingly, the second inverter control portion 43 reduces the torque command value TR2. As a result, the torque of the motor-generator MG2 is reduced.

By reducing the torque of the motor-generator MG2, the amount of electric power consumed by the motor-generator MG2 is reduced. As a result, the voltage VH is increased. However, because the voltage VH is reduced in advance at time point t1, the voltage VH does not become excessively high when the voltage VH is increased at time point t2.

By reducing the torque of the motor-generator MG2, the degree of slipping of the drive wheels gets smaller and smaller, that is, the slip ratio is reduced. When the low-μ control portion 44 determines that the vehicle has stopped slipping at time point t3, the traction control flag TRC is inactivated, and accordingly, the torque of the motor-generator MG2 is returned to the original value. Thus, because the amount of electric power consumed by the motor-generator MG2 is increased, the voltage VH is reduced. When the low-μ determination flag is inactivated at time point t4, the control signal CTL is inactivated, and the voltage VH is returned to the original value.

As described above, in the first embodiment, when the low-μ control portion 44 determines that the road surface has a low μ value, the converter control portion 41 and the boost converter 10 reduce the voltage VH, that is, the voltage input to the inverters 20 and 30. In other words, when the low-μ control portion 44 determines that the road surface has a low μ value, the low-μ control portion 44 reduces the voltage VH in advance before the vehicle actually slips. Thus, in the first embodiment, although the torque of the motor-generator MG2 is reduced when the vehicle slips, the voltage VH is prevented from becoming excessively high.

Figure 5:
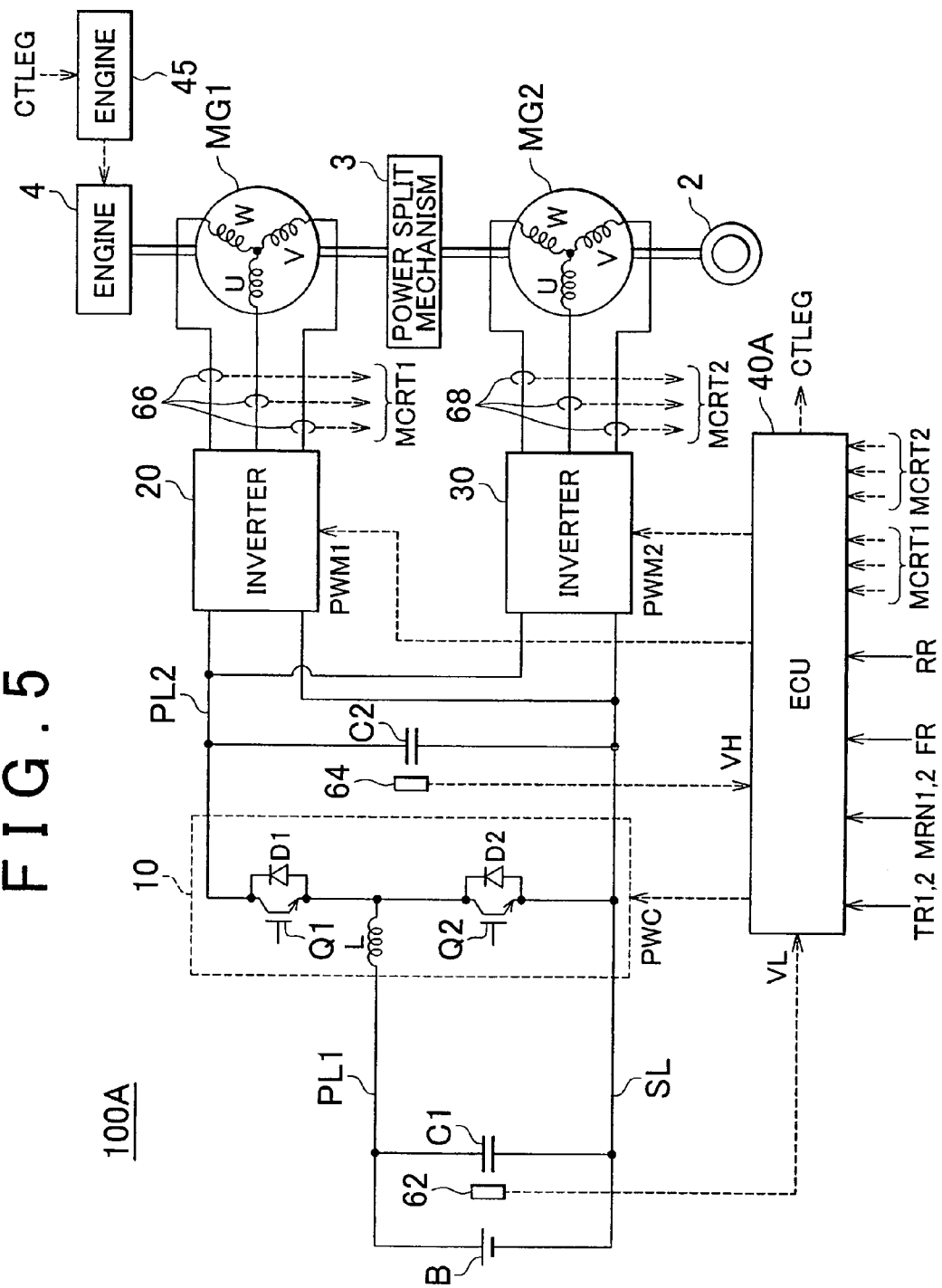
FIG. 5 is a schematic block diagram of a hybrid vehicle that is an example of an electric vehicle provided with a control apparatus according to a second embodiment of the invention.

FIG. 5 is a schematic block diagram of a hybrid vehicle that is an example of an electric vehicle provided with a control apparatus according to a second embodiment of the invention. As shown in FIG. 5, the configuration of the hybrid vehicle 100A is the same as that of the hybrid vehicle 100 shown in FIG. 1, except that the hybrid vehicle 100A includes an ECU 40A instead of the ECU 40, and further includes an engine ECU 45.

The engine ECU 45 receives a control signal CTLEG from the ECU 40A. When the control signal CTLEG is activated, the engine ECU 45 controls the engine 4 to reduce the speed of the engine 4. Thus, when the control signal CTLEG is activated, the amount of electric power generated by the motor-generator MG1 using the power supplied from the engine 4 is reduced.

The ECU 40 determines whether the vehicle is slipping based on the rotation speeds FR and RR, using a method similar to that used by the ECU 40 in the first embodiment. When the ECU 40A determines that the vehicle is slipping, the ECU 40A activates the control signal CTLEG output to the engine ECU 45. The other functions of the ECU 40A are the same as those of the ECU 40 in the first embodiment.

The other portions of the configuration of the hybrid vehicle 100A are the same as those of the configuration of the hybrid vehicle 100.

Figure 6:
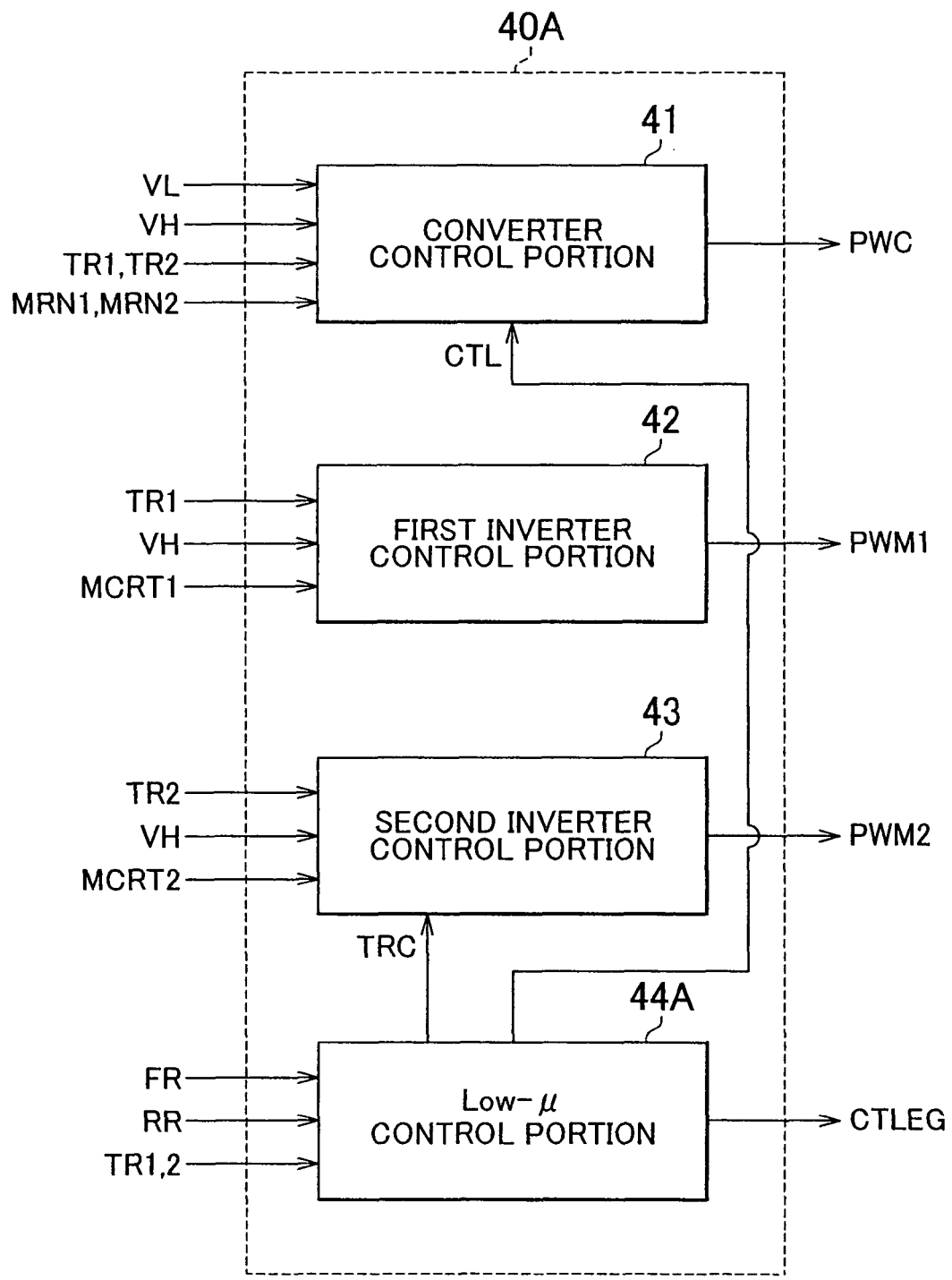
FIG. 6 is a functional block diagram of an ECU shown in FIG. 5.

FIG. 6 is a functional block diagram of the ECU 40A shown in FIG. 5. As shown in FIG. 6, the configuration of the ECU 40A is the same as that of the ECU 40 shown in FIG. 2, except that the ECU 40A includes a low-μ control portion 44A, instead of the low-μ control portion 44.

The low-μ control portion 44A determines whether the vehicle is slipping using a method similar to the method used by the low-μ control portion 44 in the first embodiment. When the low-μ control portion 44A determines that the vehicle is slipping, the low-μ control portion 44 activates the traction control flag TRC output to the second inverter control portion 43, and activates the control signal CTLEG output to the engine ECU 45. The other functions of the low-μ control portion 44A are the same as those of the low-μ control portion 44.

Figure 7:
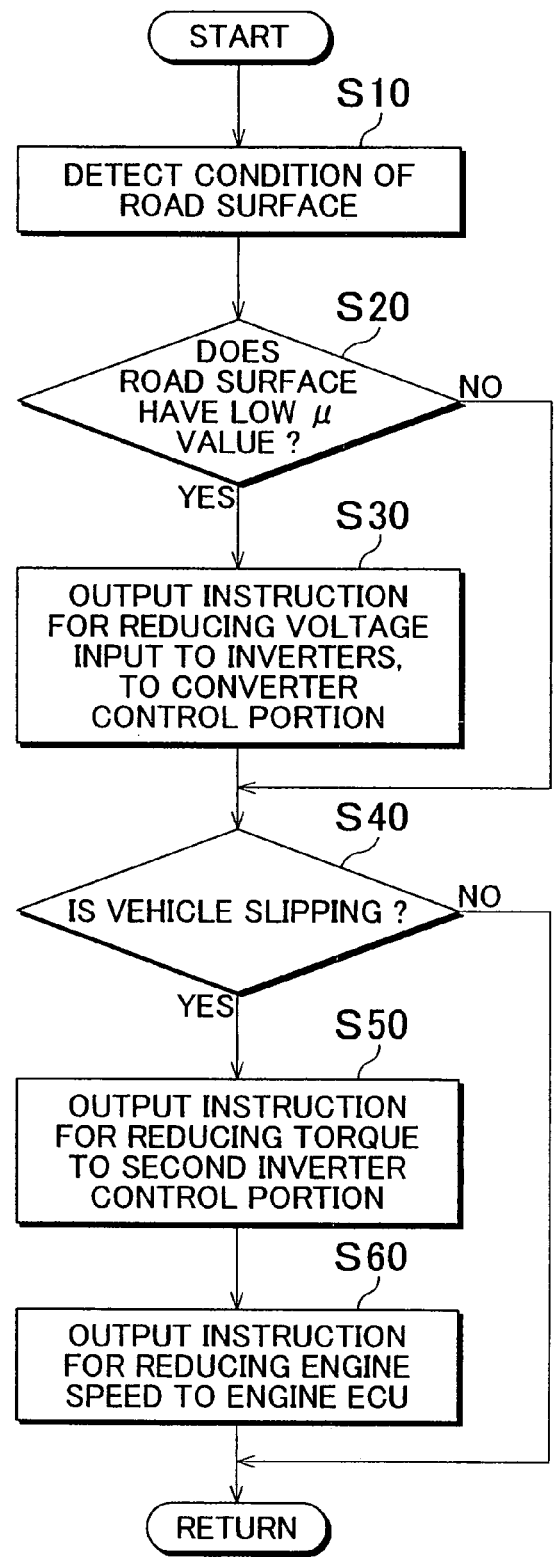
FIG. 7 is a flowchart showing the structure of a control executed by a low-μ control portion shown in FIG. 6.

FIG. 7 is a flowchart showing the structure of a control executed by the low-μ control portion 44A shown in FIG. 6. The routine shown by the flowchart is also invoked from a main routine and executed at regular time intervals, or each time a predetermined condition is satisfied.

The flowchart shown in FIG. 7 is the same as the flowchart shown in FIG. 3, except that the flowchart shown in FIG. 7 further includes step S60. That is, when the low-μ control portion 44A outputs the instruction for reducing the torque of the motor-generator MG2 to the inverter control portion 43 (step S50), the low-μ control portion 44A activates the control signal CTLEG output to the engine ECU 45, and outputs an instruction for reducing the speed of the engine 4 to the engine ECU 45 (step S60).

Though not illustrated in FIG. 7, if it is determined that the vehicle has stopped slipping (NO in step S40) while the instruction for reducing the speed of the engine 4 is output to the engine ECU 45, the instruction is cancelled.

Figure 8:
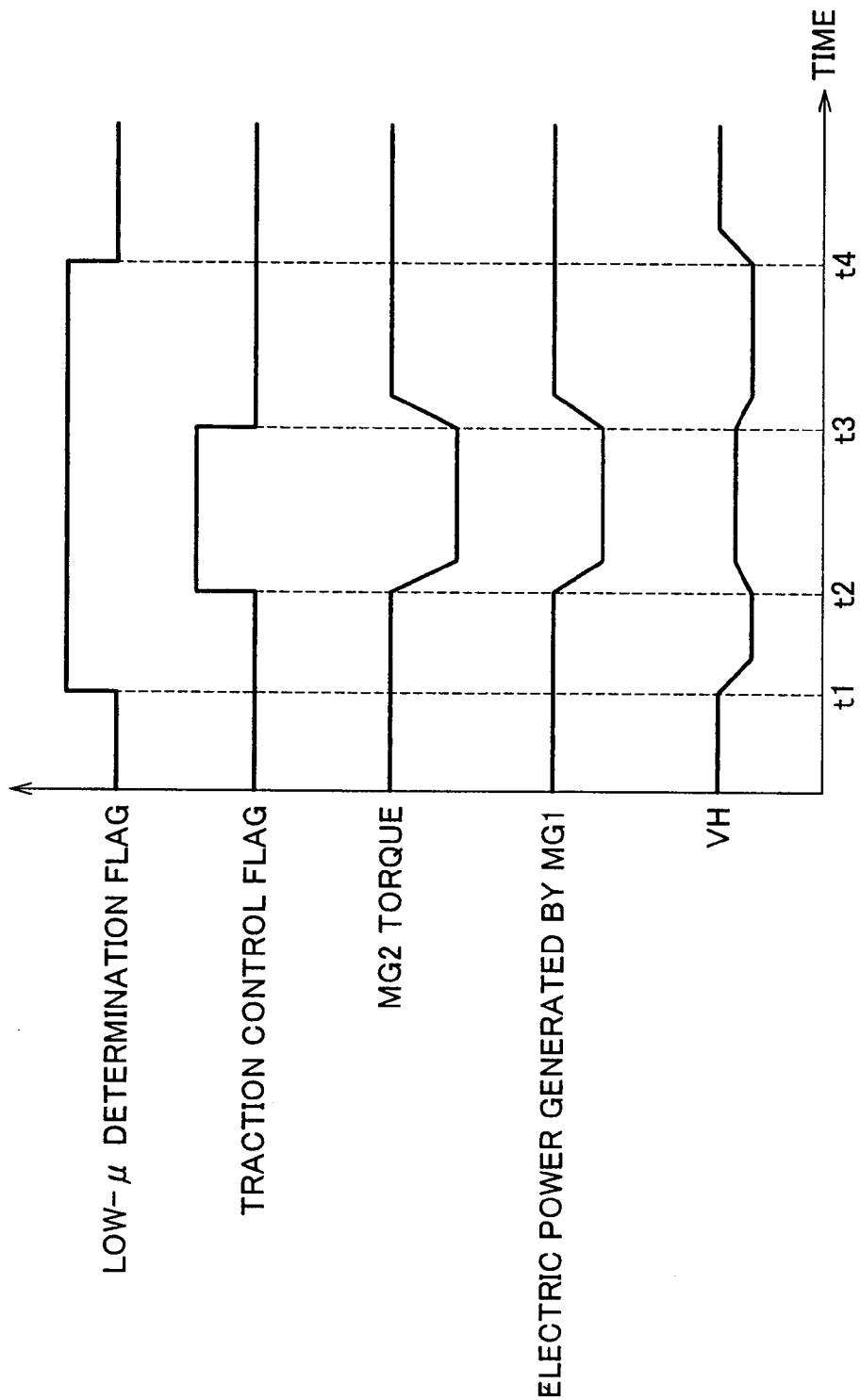
FIG. 8 is a timing chart of main signals and the like in the second embodiment.

FIG. 8 is a timing chart of main signals and the like in the second embodiment. As shown in FIG. 8, at time point t2, the low-μ control portion 44A determines that the vehicle is slipping and activates the traction control flag TRC and the control signal CTLEG. Accordingly, the second inverter control portion 43 reduces the torque command value TR2. As a result, the torque of the motor-generator MG2 is reduced. The engine ECU 45 reduces the speed of the engine 4. This reduces the amount of electric power generated by the motor-generator MG1 using the power supplied from the engine 4.

Thus, although the amount of electric power consumed by the motor-generator MG2 is reduced due to the reduction in the torque of the motor-generator MG2, the increase in the voltage VH is suppressed, because the amount of electric power generated by the motor-generator MG1 is also reduced. Accordingly, in the second embodiment, the amount by which the voltage VH is reduced at time point t1 can be reduced.

When the low-μ control portion 44A determines that the vehicle has stopped slipping at time point t3, the traction control flag TRC and the control signal CTLEG are inactivated. Accordingly, the torque of the motor-generator MG2 is returned to the original value and, therefore, the amount of electric power consumed by the motor-generator MG2 is increased. As a result, the voltage VH is reduced. Also, the speed of the engine 4 is returned to the original value, and the amount of electric power generated by the motor-generator MG1 is returned to the original value. When the low-μ determination flag is inactivated at time point t4, the control signal CTL is inactivated, and the voltage VH is returned to the original value.

As described above, in the second embodiment, when the low-μ control portion 44A determines that the vehicle is slipping, the low-μ control portion 44A reduces the amount of electric power generated by the motor-generator MG1 by reducing the speed of the engine 4. This suppresses the increase in the voltage VH when the vehicle actually slips. Accordingly, in the second embodiment, it is possible to more reliably prevent an excessive voltage VH.

Further, in the second embodiment, it is possible to reduce the amount by which the voltage VH is reduced when it is determined that the road surface has a low μ value.

In the second embodiment, when it is determined that the vehicle is slipping, the amount of electric power generated by the motor-generator MG1 is reduced by reducing the speed of the engine 4. This suppresses the increase in the voltage VH. However, if the amount of electric power generated by the motor-generator MG1 is small when it is determined that the vehicle is slipping, the amount of generated electric power cannot be reduced any further. In this case, the increase in the voltage VH cannot be suppressed by reducing the amount of generated electric power. Accordingly, in a modified example of the second embodiment, when it is determined that the road surface has a low μ value, the amount of electric power generated by the motor-generator MG1 is increased. Thus, the amount of electric power generated by the motor-generator MG1 can be reliably reduced when it is determined later that the vehicle is slipping.

Figure 9:
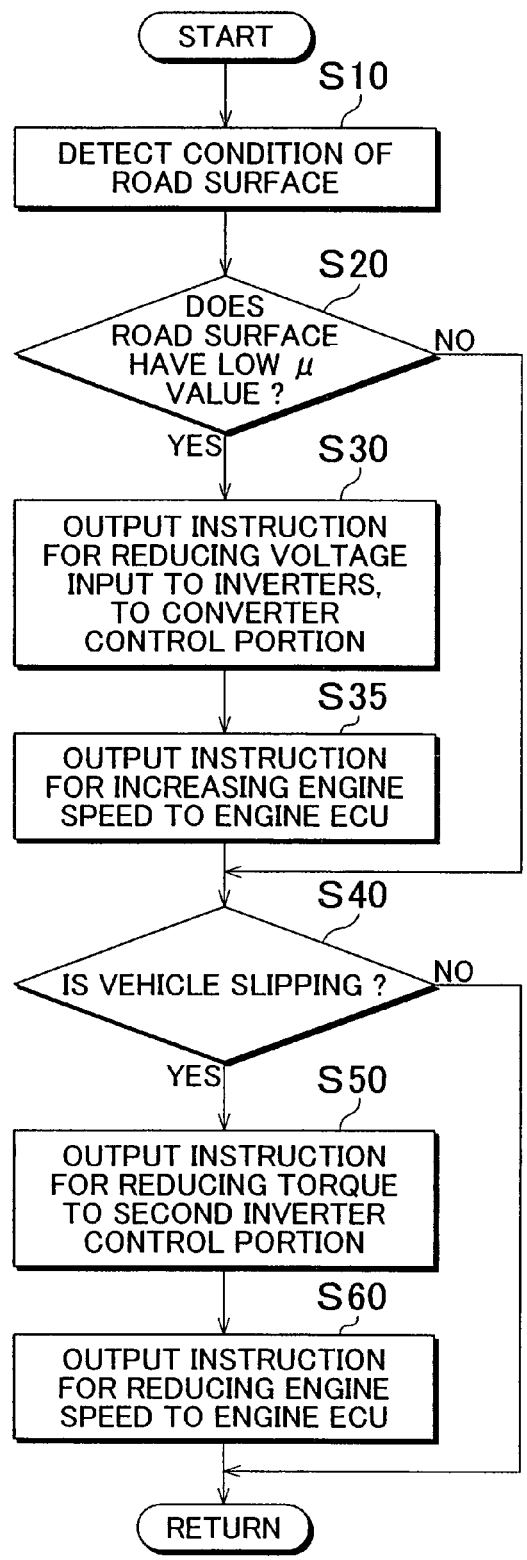
FIG. 9 is a flowchart showing the structure of a control executed by a low-μ control portion in a modified example of the second embodiment.

FIG. 9 is a flowchart showing the structure of a control executed by the low-μ control portion 44A in the modified example of the second embodiment. The routine shown by the flowchart is also invoked from a main routine and executed at regular time intervals, or each time a predetermined condition is satisfied.

The flowchart in FIG. 9 is the same as the flowchart in FIG. 7, except that the flowchart in FIG. 9 further includes step S35. That is, when the low-μ control portion 44A outputs the instruction for reducing the voltage input to the inverters 20 and 30 (i.e., the voltage VH), to the converter control portion 41 (step S30), the low-μ control portion 44A activates a control signal for increasing the speed of the engine 4, thereby instructing the engine ECU 45 to increase the speed of the engine 4 (step S35).

Though it is not illustrated in FIG. 9, if it is determined that the road surface does not have a low-μ value (NO in step S20) while the instruction for increasing the speed of the engine 4 is output to the engine ECU 45, the instruction is cancelled.

Figure 10:
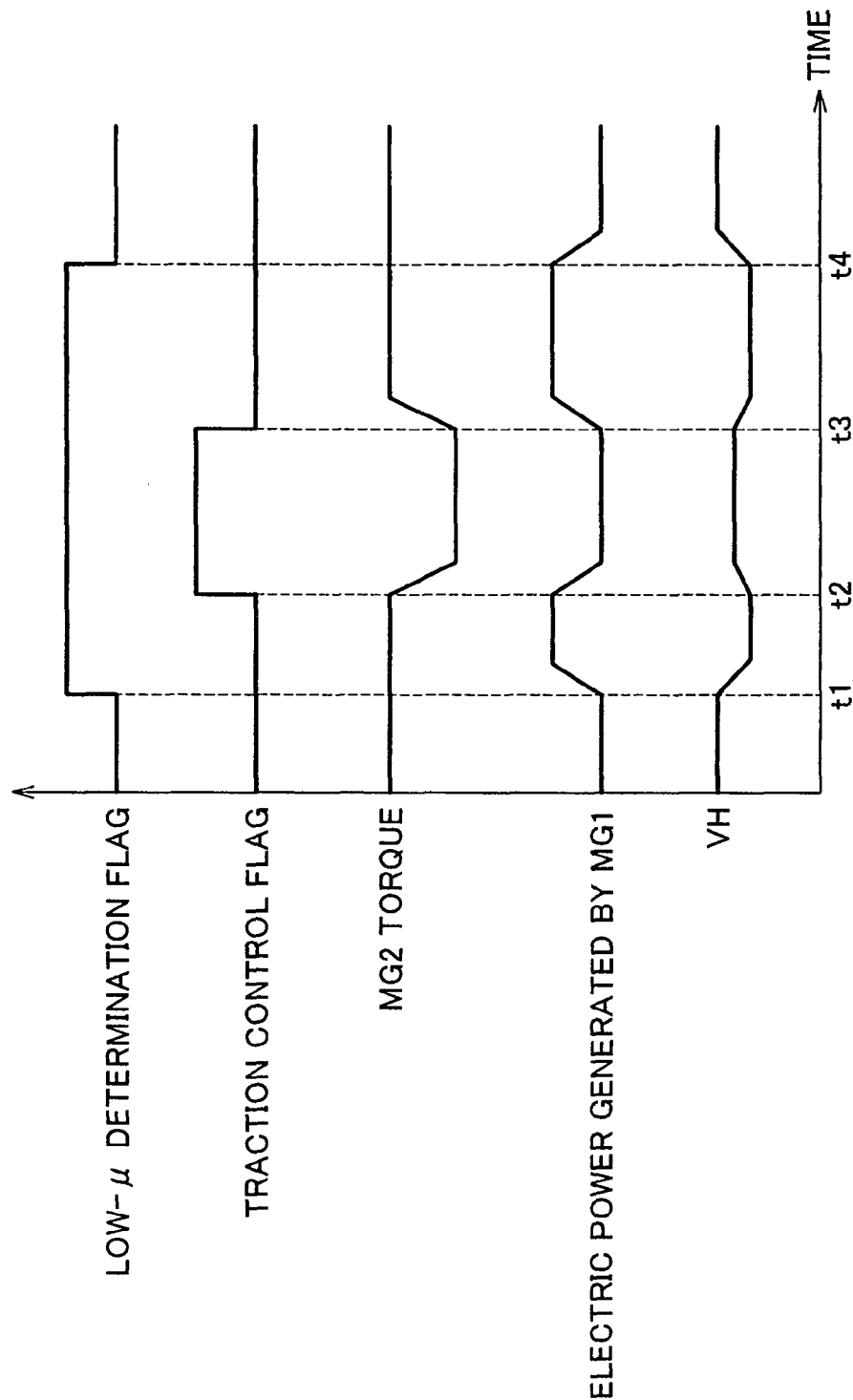
FIG. 10 is a timing chart of main signals and the like in the modified example of the second embodiment.

FIG. 10 is a timing chart of main signals and the like in the modified example of the second embodiment. As shown in FIG. 10, at time point t1, the low-μ control portion 44A determines that the road surface has a low μ value, and activates the low-μ determination flag. Accordingly, the control signal CTL is activated, and the converter control portion 41 reduces the voltage command value for the power source line PL2. As a result, the voltage VH is reduced. Also, the control signal for increasing the speed of the engine 4 is activated, and the engine ECU 45 increases the speed of the engine 4. This increases the amount of electric power generated by the motor-generator using the power supplied from the engine 4.

At time point t2, the low-μ control portion 44A determines that the vehicle is slipping, and activates the traction control flag TRC and the control signal CTLEG Accordingly, the second inverter control portion 43 reduces the torque command value TR2. As a result, the torque of the motor-generator MG2 is reduced.

The engine ECU 45 reduces the speed of the engine 4. Because the speed of the engine 4 is increased and, therefore, the amount of electric power generated by the motor-generator MG1 is increased at time point t1, the engine ECU 45 may reliably and sufficiently reduce the speed of the engine 4. This reliably and sufficiently reduces the amount of electric power generated by the motor-generator MG1.

Thus, although the amount of electric power consumed by the motor-generator MG2 is reduced due to the reduction in the torque of the motor-generator MG2, the increase in the voltage VH is reliably suppressed, because the amount of electric power generated by the motor-generator MG1 is also reliably and sufficiently reduced.

As described above, in the modified example of the second embodiment, when the low-μ control portion 44A determines that the road surface has a low μ value, the low-μ control portion 44A increases the amount of electric power generated by the motor-generator MG1 by increasing the speed of the engine 4. Thus, the amount of electric power generated by the motor-generator MG1 can be reliably reduced when the vehicle slips later. Accordingly, in the modified example of the second embodiment, it is possible to more reliably prevent an excessive voltage VH.

In a third embodiment, when it is determined that the vehicle is slipping, the torque of the motor-generator MG2 is reduced at a rate that is lower than a rate while no slipping is determined. This prevents a sharp change in the balance between the amount of electric power generated by the motor-generator MG1 and the amount of electric power consumed by the motor-generator MG2, and prevents an excessive voltage VH.

The configuration of the hybrid vehicle 100B in the third embodiment is the same as the configuration of the hybrid vehicle 100 in the first embodiment shown in FIG. 1, except that the hybrid vehicle 100B includes an ECU 40B instead of the ECU 40.

Figure 11:
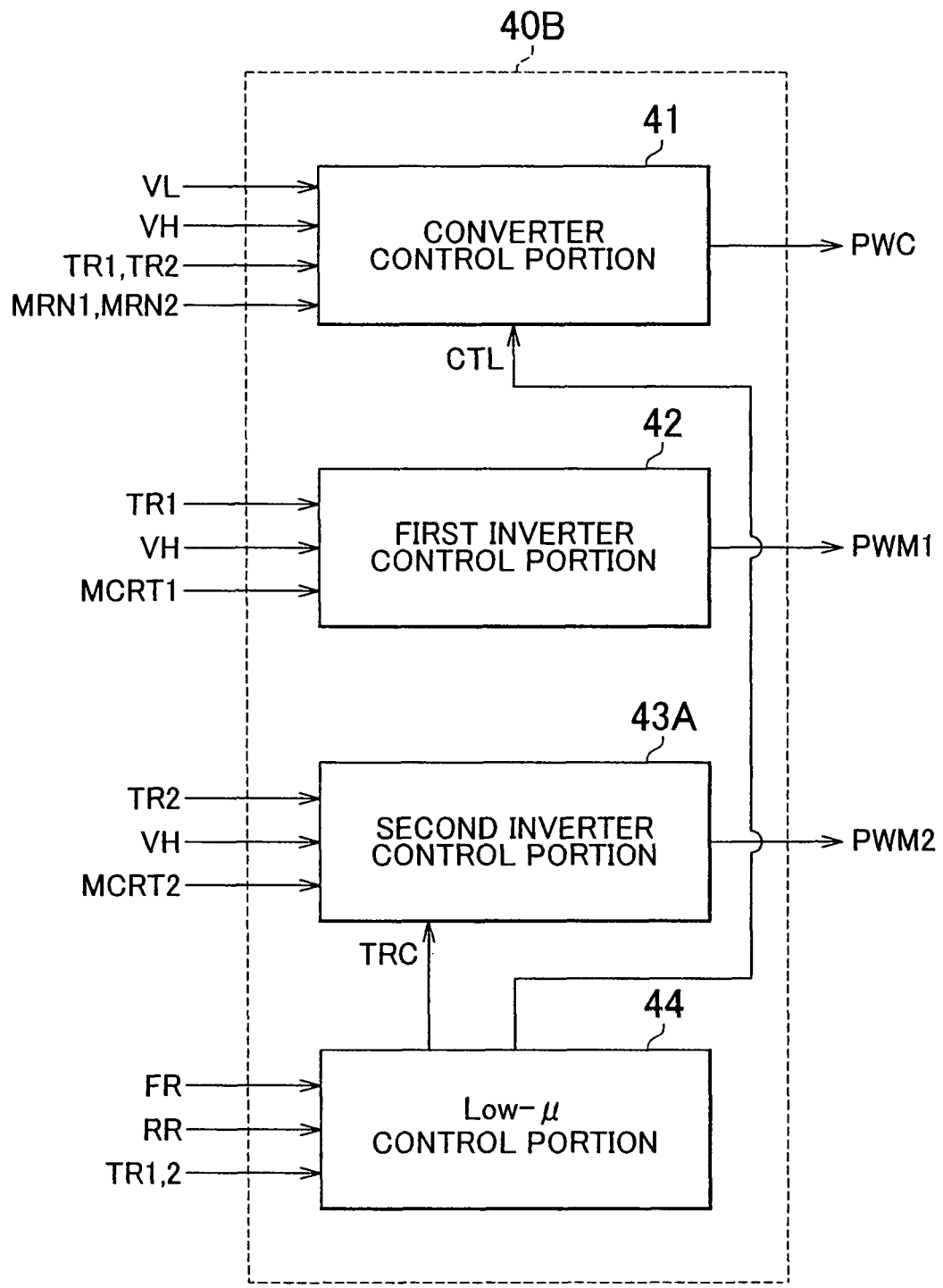
FIG. 11 is a functional block diagram of an ECU in a third embodiment.

FIG. 11 is a functional block diagram of the ECU 40B in the third embodiment. As shown in FIG. 1, the configuration of the ECU 40B is the same as the configuration of the ECU 40 in the first embodiment shown in FIG. 2, except that the ECU 40B includes a second inverter control portion 43A instead of the second inverter control portion 43.

When the traction control flag TRC output from the low-μ control portion 44 is activated, the second inverter control portion 43A reduces the torque command value TR2 to reduce the torque of the motor-generator MG2. The second inverter control portion 43A reduces the torque command value TR2 at a predetermined rate to prevent a sharp change in the balance between the amount of electric power generated by the motor-generator MG1 and the amount of electric power consumed by the motor-generator MG2 when the amount of electric power consumed by the motor-generator MG2 is reduced due to the reduction in the torque of the motor-generator MG2. Then, the second inverter control portion 43A generates the signal PWM2 using the reduced torque command value TR2.

When the traction control flag TRC is not activated, and when the motor-generator MG2 is returned to the original value, the second inverter control portion 43A does not limit the rate of change in the torque command value to a specific rate. That is, when it is determined that the vehicle is slipping, the second inverter control portion 43A reduces the torque command value TR2 for the motor-generator MG2 at a rate that is lower than a rate while no slipping is determined.

The other functions of the second inverter control portion 43A are the same as those of the second inverter control portion 43 in the first embodiment shown in FIG. 2.

Figure 12:
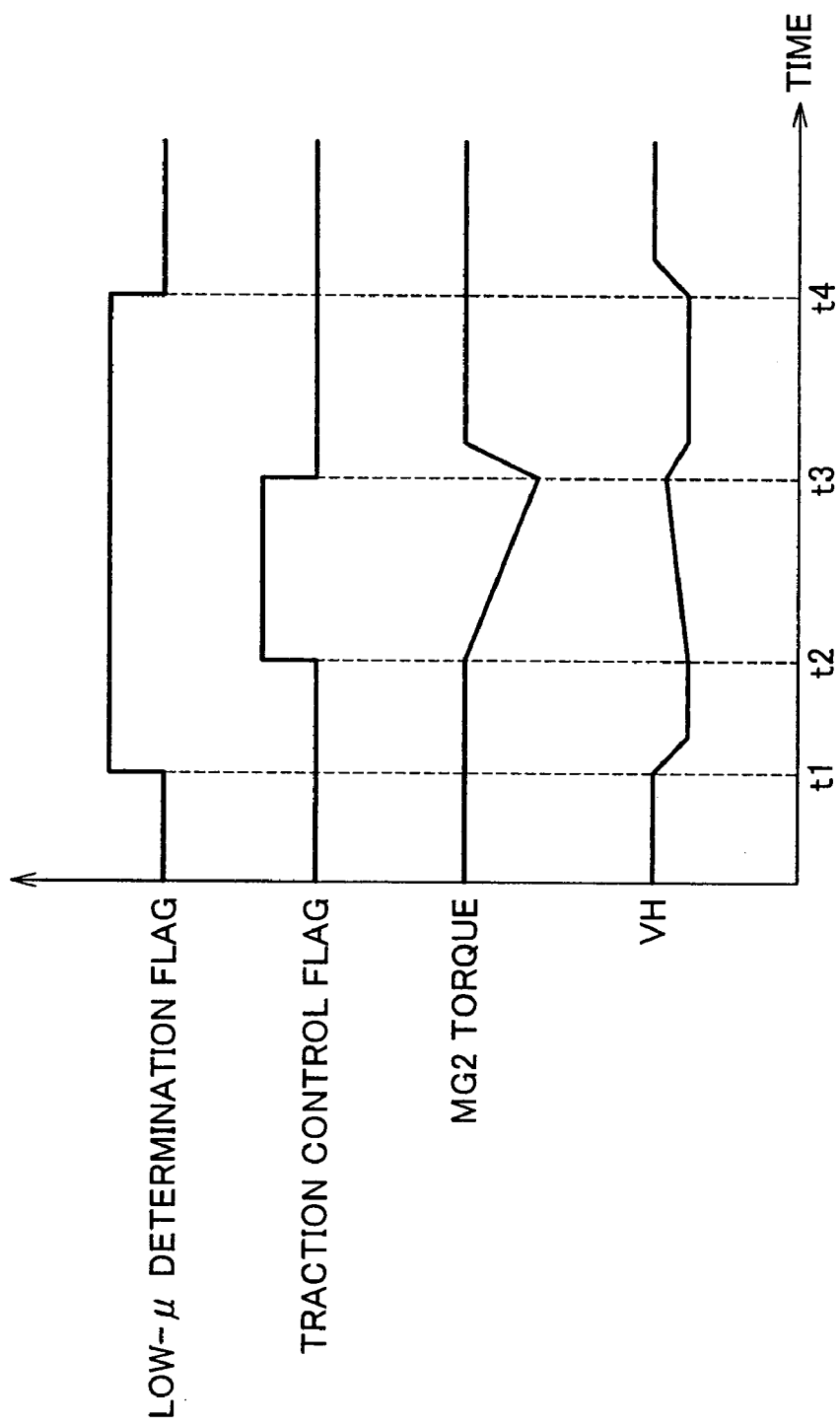
FIG. 12 is a timing chart of main signals and the like in the third embodiment.

FIG. 12 is a timing chart of main signals and the like in the third embodiment. As shown in FIG. 12, at time point t2, the low-$\mu$ control portion 44 determines that the vehicle is slipping, and activates the traction control flag TRC. Accordingly, the second inverter control portion 43A reduces the torque command value TR2 at the predetermined rate. As a result, the torque of the motor-generator MG2 is gradually reduced.

Thus, the amount of electric power consumed by the motor-generator MG2 is gradually reduced. This prevents a sharp change in the balance between the amount of electric power generated by the motor-generator MG1 and the amount of electric power consumed by the motor-generator MG2. Therefore, the boost converter 10 can operate in accordance with the gradual change in the balance between the amount of electric power generated by the motor-generator MG1 and the amount of electric power consumed by the motor-generator MG2. This suppresses the increase in the voltage VH.

As described above, in the third embodiment, when the low-$\mu$ control portion 44 determines that the vehicle is slipping, the second inverter control portion 43A and the inverter 30 reduce the torque of the motor-generator MG2 at the rate that is lower than a rate while no slipping is determined by the low-$\mu$ control portion 44. This prevents a sharp reduction in the amount of electric power consumed by the motor-generator MG2 when the vehicle slips. Accordingly, in the third embodiment, it is possible to prevent a sharp change in the balance between the amount of electric power generated by the motor-generator MG1 and the amount of electric power consumed by the motor-generator MG2 when the vehicle slips. As a result, it is possible to reliably prevent an excessive voltage VH.

Figure 13:
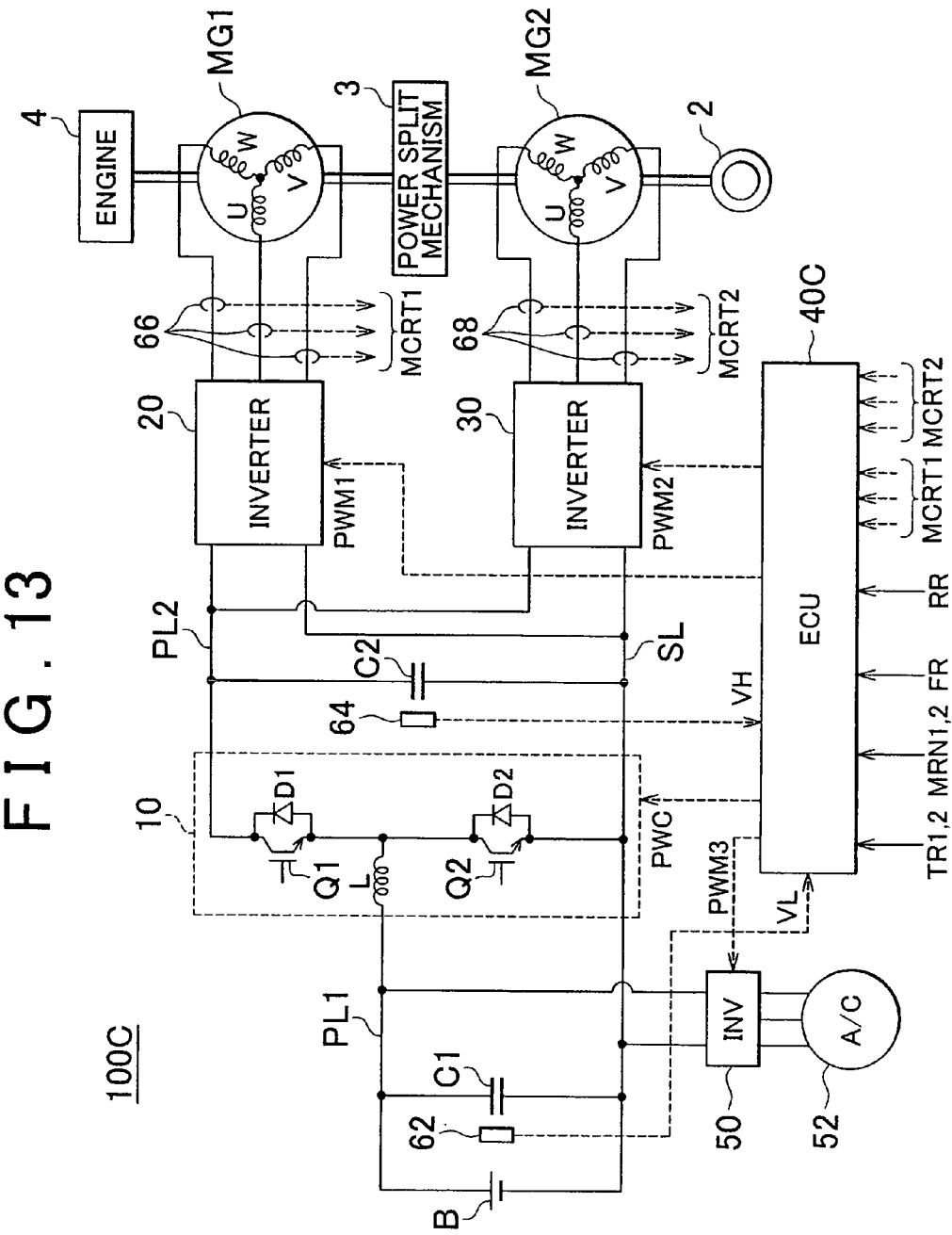
FIG. 13 is a schematic block diagram of a hybrid vehicle that is an example of an electric vehicle provided with a control apparatus according to a fourth embodiment of the invention.

FIG. 13 is a schematic block diagram of a hybrid vehicle that is an example of an electric vehicle provided with a control apparatus according to a fourth embodiment of the invention. As shown in FIG. 13, the configuration of the hybrid vehicle 100C is the same as the configuration of the hybrid vehicle 100, except that the hybrid vehicle 100C includes an ECU 40C instead of the ECU 40, and further includes an inverter 50, and an electric air conditioner compressor 52.

The inverter 50 is connected to the power source line PL1, and to the ground line SL. The inverter 50 converts the DC electric power, which is supplied from the power source line PL1, to the AC electric power, based on a signal PWM3 output from the ECU 40C. Then, the inverter 50 outputs the AC electric power to the electric air conditioner compressor 52.

The electric air conditioner compressor 52 is an electric compressor for an electric air conditioner, which is provided in the hybrid vehicle 100C. The electric air conditioner compressor 52 is driven by the AC electric power supplied from the inverter 50. That is, the electric air conditioner compressor 52 receives the electric power from the power source line PL1 via the inverter 50. In other words, the electric air conditioner compressor 52 is driven using the electric power generated by the motor-generator MG1.

The ECU 40C determines whether the vehicle is slipping using a method similar to the method used by the ECU 40. When the ECU 40C determines that the vehicle is slipping, the ECU 40C generates the signal PWM3 for driving the electric air conditioner compressor 52, and outputs the signal PWM3 to the inverter 50.

If the ECU 40C determines that the vehicle is slipping while the electric air conditioner compressor 52 is being driven, the ECU 40C generates the signal PWM3 to increase the amount of electric power consumed by the electric air conditioner compressor 52.

The other portions of the configuration of the ECU 40C are the same as those of the configuration of the ECU 40 in the first embodiment.

Figure 14:
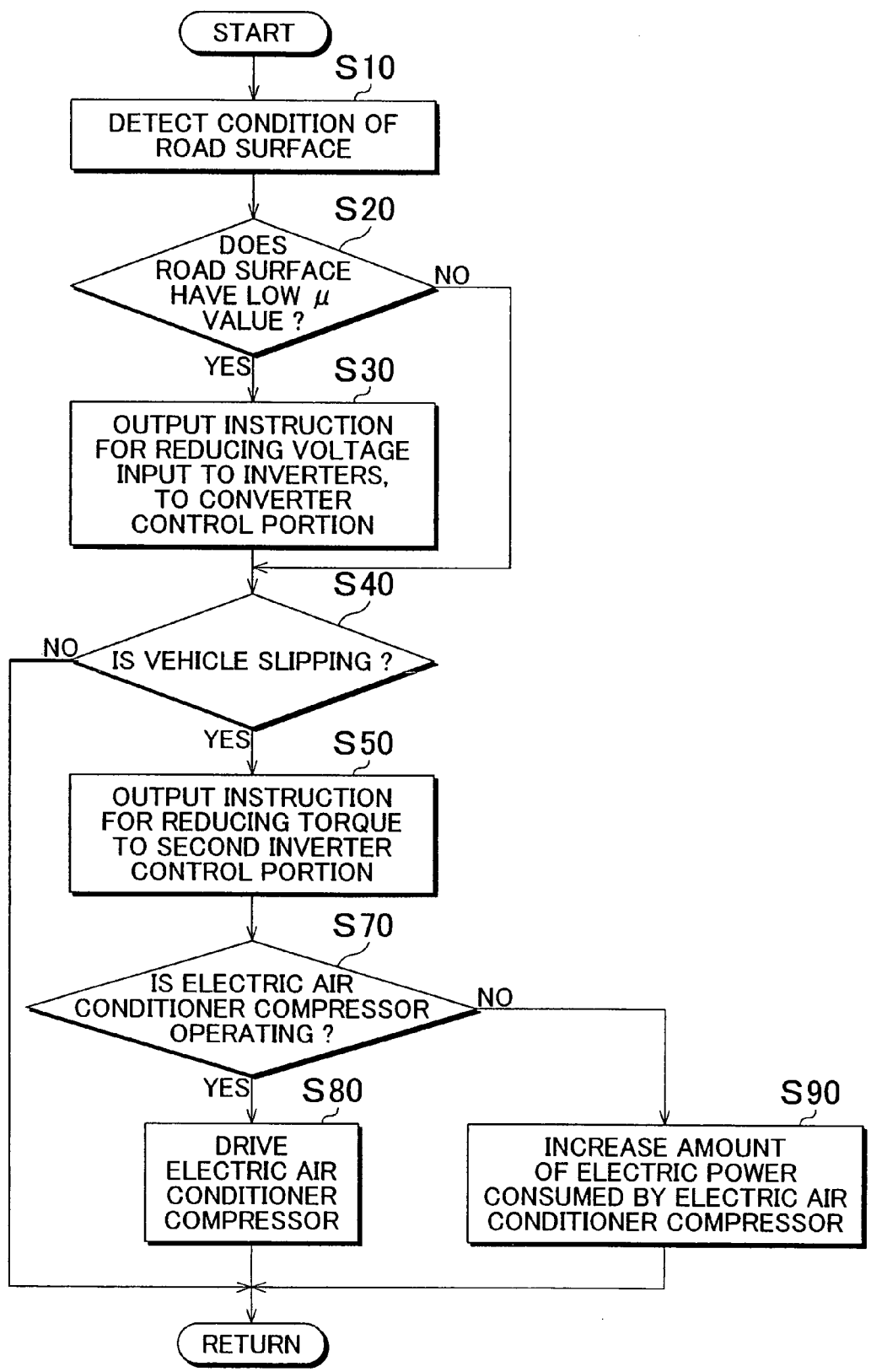
FIG. 14 is a flowchart relating to a low-μ control executed by an ECU shown in FIG. 13.

FIG. 14 is a flowchart relating to a low-$\mu$ control executed by the ECU 40C shown in FIG. 13. The routine shown by the flowchart is also invoked from a main routine and executed at regular time intervals, or each time a predetermined condition is satisfied.

The flowchart in FIG. 14 is the same as the flowchart in FIG. 3, except that the flowchart in FIG. 14 further includes steps S70, S80, and S90. That is, when it is determined that the vehicle is slipping in step S40, and the instruction for reducing the torque of the motor-generator MG2 is output to the inverter control portion 43 in step S50, the ECU 40C determines whether the electric air conditioner is operating (step S70).

When it is determined that the electric air conditioner is not operating in step S70 (NO in step S70), the ECU 40C generates the signal PWM3 for driving the electric air conditioner compressor 52, and outputs the signal PWM3 to the inverter 50. Thus, the inverter 50 drives the electric air conditioner compressor 52 using the electric power generated by the motor-generator MG1 (step S80).

When it is determined that the electric air conditioner is operating in step S70 (YES in step S70), the ECU 40C generates the signal PWM3 to increase the amount of electric power consumed by the electric air conditioner compressor 52, and outputs the signal PWM3 to the inverter 50. This increases the amount of electric power consumed by the electric air conditioner compressor 52 that is driven by the electric power generated by the motor-generator MG1 (step S90).

Figure 15:
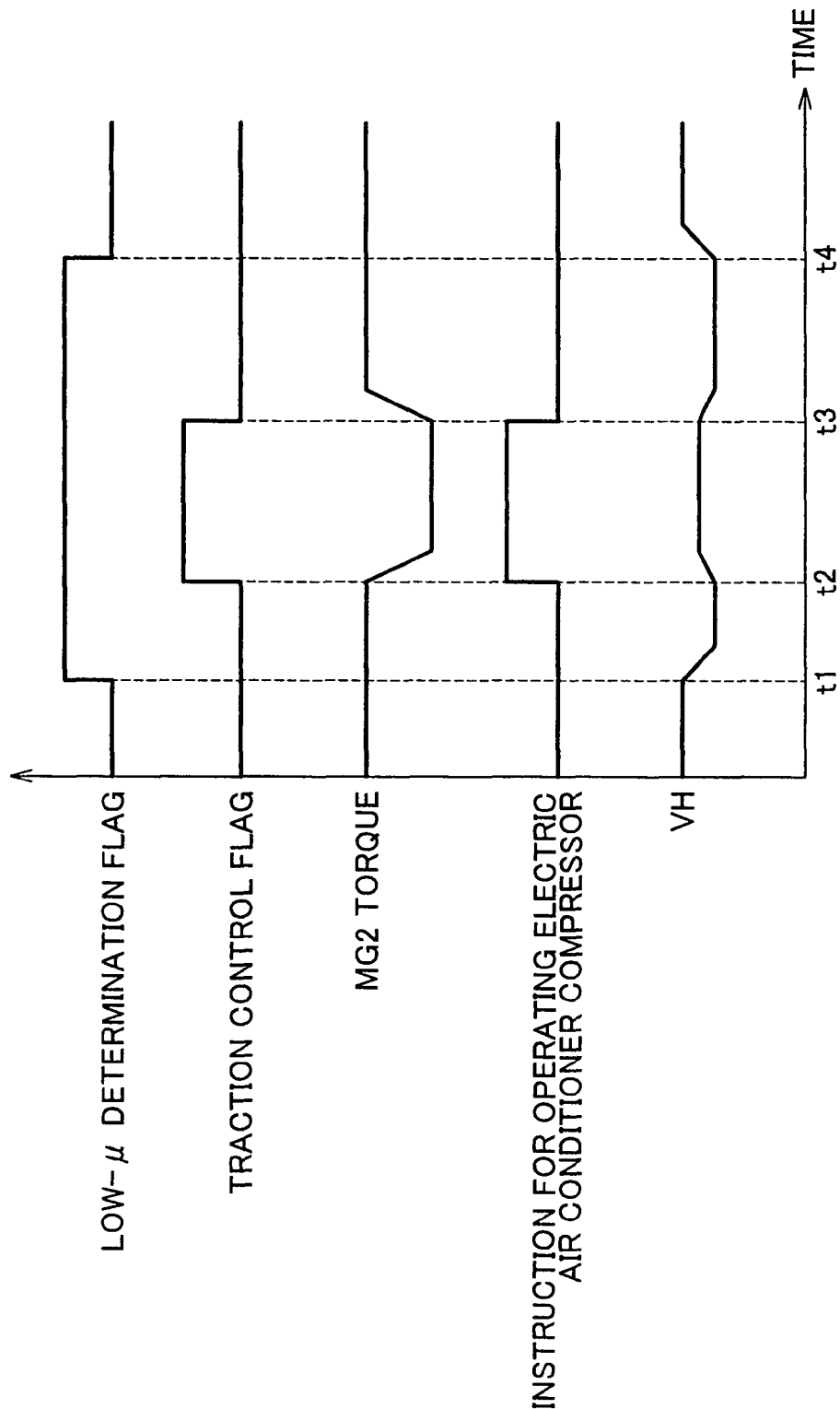
FIG. 15 is a timing chart of main signals and the like in the fourth embodiment.

FIG. 15 is a timing chart of main signals and the like in the fourth embodiment. In FIG. 15, when it is determined that the road surface has a low $\mu$ value at time point t1, the electric air conditioner is not operating.

As shown in FIG. 15, at time point t2, the ECU 40C determines that the vehicle is slipping, and activates the traction control flag TRC. Accordingly, the ECU 40C reduces the torque command value TR2. As a result, the torque of the motor-generator MG2 is reduced. Also, the ECU 40 activates an instruction for operating the electric air conditioner 52, and generates the signal PWM3 for driving the electric air conditioner compressor 52 and outputs the signal PWM3 to the inverter 50. Thus, the inverter 50 drives the electric air conditioner compressor 52. As a result, the electric air conditioner compressor 52 consumes the electric power generated by the motor-generator MG1.

That is, although the amount of electric power consumed by the motor-generator MG2 is reduced due to the reduction in the torque of the motor-generator MG2 when the vehicle slips, the amount of electric power generated by the motor-generator MG1 is prevented from becoming excessively large, because the electric air conditioner compressor 52 consumes the electric power. As a result, the increase in the voltage VH is suppressed.

In the above-described embodiment, the inverter 50 is connected to the power source line PL1 and to the ground line SL. However, the inverter 50 may be connected to the power source line PL2 whose voltage is higher than that of the power source line PL1, and to the ground line SL.

As described above, in the fourth embodiment, when it is determined that the vehicle is slipping, the ECU 40C increases the amount of electric power consumed by the electric air conditioner compressor 52. Therefore, although the amount of electric power consumed by the motor-generator MG2 is reduced due to the reduction in the torque of the motor-generator MG2 when the vehicle slips, it is possible to prevent a sharp change in the balance between the amount of generated electric power and the amount of consumed electric power. Thus, in the fourth embodiment, it is possible to reliably prevent an excessive voltage VH when the vehicle slips.

Figure 16:
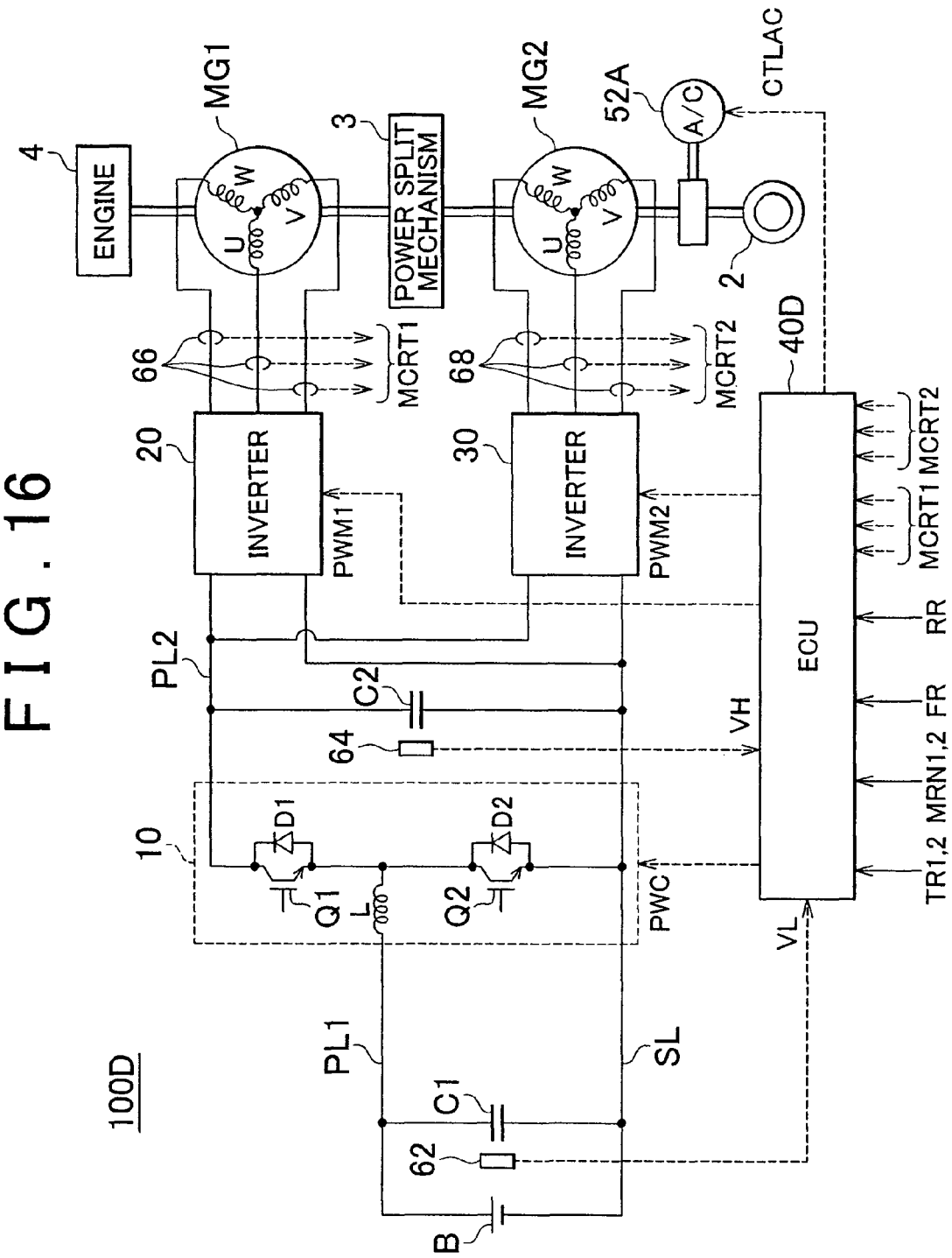
FIG. 16 is a schematic block diagram of a hybrid vehicle that is an example of an electric vehicle provided with a control apparatus according to a fifth embodiment of the invention.

FIG. 16 is a schematic block diagram of a hybrid vehicle that is an example of an electric vehicle provided with a control apparatus according to a fifth embodiment of the invention. As shown in FIG. 16, the configuration of the hybrid vehicle 100D is the same as that of the hybrid vehicle 100 shown in FIG. 1, except that the hybrid vehicle 100D includes an ECU 40D instead of the ECU 40, and further includes an air conditioner compressor 52A.

The air conditioner compressor 52A is a compressor for an air conditioner, which is provided in the hybrid vehicle 100D. The air conditioner compressor 52A is connected to the drive shaft of the vehicle, and is driven by torque output from the motor-generator MG2 to the drive shaft.

The ECU 40D determines whether the vehicle is slipping using a method similar to the method used by the ECU 40. When it is determined that the vehicle is slipping, the ECU 40D controls the air conditioner compressor 52A to apply a load. If it is determined that the vehicle is slipping while the air conditioner compressor 52A applies the load, the ECU 40D controls the air conditioner compressor 52A to increase the amount of load applied by the air conditioner compressor 52A. The other portions of the configuration of the ECU 40D are the same as those of the configuration of the ECU 40 in the first embodiment.

In the hybrid vehicle 100D, when it is determined that the vehicle is slipping, the ECU 40D controls the air conditioner compressor 52A to apply the load, or to increase the amount of load applied by the air conditioner compressor 52A. Thus, even when the torque output from the motor-generator MG2 to the drive shaft is constant, the torque transmitted to the drive wheels 2 is reduced. Accordingly, in the hybrid vehicle 100D, when it is determined that the vehicle is slipping, the ECU 40D reduces the torque of the motor-generator MG2 by an amount that is smaller than that by which the ECU 40 reduces the torque of the motor-generator MG2 in the first embodiment. Alternatively, when it is determined that the vehicle is slipping, the ECU 40D does not reduce the torque of the motor-generator MG2.

Thus, in the hybrid vehicle 100D, when the vehicle slips, it is possible to reduce the amount by which the amount of electric power consumed by the motor-generator MG2 is reduced. This prevents a sharp change in the balance between the amount of electric power generated by the motor-generator MG1 and the amount of electric power consumed by the motor-generator MG2. As a result, the increase in the voltage VH is suppressed.

As described above, in the fifth embodiment as well, it is possible to reliably prevent an excessive voltage VH when the vehicle slips.

Though it is not illustrated in the figures, any two or more of the first to fifth embodiments may be combined. In each of the above-described embodiments, the condition of the road surface is detected by determining whether the road surface has a high μ value or a low μ value. However, the friction coefficient of the road surface may be estimated by calculations, and the condition of the road surface may be detected based on the calculated friction coefficient. The friction coefficient of the road surface may be estimated by various known methods.

In each of the above-described embodiments, when the vehicle slips, the second inverter control portion 43 (43A) reduces the torque command value TR2. However, the external ECU, which generates the torque command value TR2, may reduce the torque command value TR2.

In the second embodiment, and the modified example of the second embodiment, the amount of electric power generated by the motor-generator MG1 is increased or reduced by increasing or reducing the speed of the engine 4. However, the amount of electric power generated by the motor-generator MG1 may be increased or reduced by increasing or reducing the torque of the motor-generator MG1.

In the fourth embodiment, the electric air conditioner compressor 52 is used as an example of the auxiliary machine. In the fifth embodiment, the air conditioner compressor 52A is used as an example of the auxiliary machine. However, the auxiliary machine is not limited to the electric air conditioner compressor 52 or the air conditioner compressor 52A. For example, the auxiliary machine may be a DC/DC converter connected to the power source line PL1.

In each of the above-described embodiments, the series/parallel type hybrid vehicle is employed. In the series/parallel type hybrid vehicle, the power split mechanism 3 can distribute the power supplied from the engine 4 to the axle and the motor-generator MG1. However, a series type hybrid vehicle may be employed. In the series type hybrid vehicle, the engine 4 is used only for driving the motor-generator MG1, and the drive power for driving the axle is generated only by the motor-generator MG2 that uses the electric power generated by the motor-generator MG1.

In each of the above-described embodiments, the hybrid vehicle is employed as an example of the electric vehicle. However, the invention can be applied to an electric automobile or a fuel-cell vehicle.

In the above description, the motor-generator MG2 may be regarded as "the motor" in the invention. The inverter 30 may be regarded as "the drive device" in the invention. The processes performed by the low-μ control portion 44 or 44A in steps S10 and S20 may be regarded as the processes performed by "the road surface condition detection portion" in the invention. The process performed by the low-μ control portions 44 or 44A in step S40 may be regarded as the process performed by "the slip determination portion" in the invention. The second inverter control portion 43 or 43A, and the inverter 30 may be regarded as "the torque reduction device" in the invention. The converter control portion 41 and the boost converter 10 may be regarded as "the voltage control device" in the invention.

The engine 4, the motor-generator MG1 and the inverter 20 may be regarded as "the power generation device" in the invention. The engine ECU 45 may be regarded as "power generation control device" in the invention. The electric air conditioner compressor 52 may be regarded as "the auxiliary machine driven using the electric power generated by the power generation device" in the invention. In this case, the ECU 40C and the inverter 50 may be regarded as "the auxiliary machine control device" in the invention. The air conditioner compressor 52A may be regarded as "the auxiliary machine that is connected to the drive shaft of the vehicle, and driven by the drive shaft" in the invention. In this case, the ECU 40D may be regarded as "the auxiliary machine control device".

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A control apparatus for an electric vehicle including a motor that generates drive power for the electric vehicle, and a drive device that drives the motor, the control apparatus comprising: a road surface condition detection portion that detects a condition of a road surface on which the electric vehicle is driven; a slip determination portion that determines whether the electric vehicle is slipping; a torque reduction device that reduces torque of the motor when the slip determination portion determines that the electric vehicle is slipping;

and a voltage control device that controls a voltage input to the drive device to reduce the voltage input to the drive device when the road surface condition detection portion determines that the road surface has a friction coefficient lower than a predetermined value, wherein the voltage input to the drive device is reduced by the voltage control device in advance of the torque reduction device reducing the torque of the motor when the slip determination portion determines that the electric vehicle is slipping.

2. The control apparatus for the electric vehicle according to claim 1, wherein: the electric vehicle further includes an electric storage device; and the voltage control device includes: a boost converter that generates the voltage input to the drive device by boosting a voltage supplied from the electric storage device according to an instruction provided to the boost converter, and a converter control portion that outputs, to the boost converter, an instruction for reducing a rate at which the boost converter boosts the voltage supplied from the electric storage device, when the road surface condition detection portion determines that the road surface has a friction coefficient lower than the predetermined value.

3. The control apparatus for the electric vehicle according to claim 2, wherein the converter control portion outputs, to the boost converter, an instruction for stopping the boost converter from boosting the voltage supplied from the electric storage device, when the road surface condition detection portion determines that the road surface has a friction coefficient lower than the predetermined value.

4. The control apparatus for the electric vehicle according to claim 1, wherein the electric vehicle further includes a power generation device that generates electric power and supplies the generated electric power to the drive device, the control apparatus further comprising a power generation control device that controls the power generation device to reduce an amount of electric power generated by the power generation device, when the slip determination portion determines that the electric vehicle is slipping.

5. The control apparatus for the electric vehicle according to claim 4, wherein the power generation control device controls the power generation device to increase the amount of electric power generated by the power generation device, when the road surface condition detection portion determines that the road surface has a friction coefficient lower than the predetermined value.

6. The control apparatus for the electric vehicle according to claim 1, wherein the electric vehicle further includes a power generation device that generates electric power and supplies the generated electric power to the drive device, the control apparatus further comprising a power generation control device that controls the power generation device to increase an amount of electric power generated by the power generation device, when the road surface condition detection portion determines that the road surface has a friction coefficient lower than the predetermined value, and that further controls the power generation device to reduce the amount of electric power generated by the power generation device, when the slip determination portion later determines that the electric vehicle is slipping.

7. The control apparatus for the electric vehicle according to claim 1, wherein when the slip determination portion determines that the electric vehicle is slipping, the torque reduction device reduces the torque of the motor at a rate that is lower than a rate while no slipping is determined by the slip determination portion.

8. The control apparatus for the electric vehicle according to claim 1, wherein the electric vehicle further includes a power generation device that generates electric power and supplies the generated electric power to the drive device, and an auxiliary machine that is driven using the electric power generated by the power generation device, the control apparatus further comprising an auxiliary machine control device that controls the auxiliary machine to increase an amount of electric power consumed by the auxiliary machine, when the slip determination portion determines that the electric vehicle is slipping.

9. The control apparatus for the electric vehicle according to claim 1, wherein the electric vehicle further includes an auxiliary machine that is connected to a drive shaft of the electric vehicle, and driven by the drive shaft, the control apparatus further comprising an auxiliary machine control device that controls the auxiliary machine to increase an amount of load applied by the auxiliary machine, when the slip determination portion determines that the electric vehicle is slipping.

10. A control apparatus for an electric vehicle including a motor that generates drive power for the electric vehicle, and a drive device that drives the motor, wherein the electric vehicle further includes an auxiliary machine that is connected to a drive shaft of the electric vehicle, and driven by the drive shaft, the control apparatus comprising: a road surface condition detection portion that detects a condition of a road surface on which the electric vehicle is driven; a slip determination portion that determines whether the electric vehicle is slipping; an auxiliary machine control device that controls the auxiliary machine to increase an amount of load applied by the auxiliary machine, when the slip determination portion determines that the electric vehicle is slipping; and a voltage control device that controls a voltage input to the drive device to reduce the voltage input to the drive device, when the road surface condition detection portion determines that the road surface has a friction coefficient lower than a predetermined value, wherein the voltage input to the drive device is reduced by the voltage control device in advance of the auxiliary machine control device that controls the auxiliary machine increasing the amount of load applied by the auxiliary machine, when the slip determination portion determines that the electric vehicle is slipping.

11. A control method for an electric vehicle including a motor that generates drive power for the electric vehicle, and a drive device that drives the motor, comprising: detecting a condition of a road surface on which the electric vehicle is driven;

determining whether the electric vehicle is slipping; reducing torque of the motor when it is determined that the electric vehicle is slipping; and controlling a voltage input to the drive device to reduce the voltage input to the drive device when it is determined that the road surface has a friction coefficient lower than a predetermined value, wherein the voltage input to the drive device is reduced by a voltage control device in advance of the torque of the motor being reduced when the slip determination portion determines that the electric vehicle is slipping.

12. The control method for the electric vehicle according to claim 11, wherein the step of controlling the voltage input to the drive device includes: generating the voltage input to the drive device by boosting a voltage supplied from an electric storage device according to an instruction; and outputting an instruction for reducing a rate at which the voltage supplied from the electric storage device is boosted, when it is determined that the road surface has a friction coefficient lower than the predetermined value.

13. The control method for the electric vehicle according to claim 12, wherein the step of outputting the instruction for reducing the rate at which the voltage supplied from the electric storage device is boosted includes outputting an instruction for stopping boosting the voltage supplied from the electric storage device, when it is determined that the road surface has a friction coefficient lower than the predetermined value in the step of detecting the condition of the road surface.

14. The control method for the electric vehicle according to claim 11, wherein the electric vehicle further includes a power generation device that generates electric power and supplies the generated electric power to the drive device, the control method further comprising controlling the power generation device to reduce an amount of electric power generated by the power generation device, when it is determined that the electric vehicle is slipping in the step of determining whether the electric vehicle is slipping.

15. The control method for the electric vehicle according to claim 14, further comprising controlling the power generation device to increase the amount of electric power generated by the power generation device, when it is determined that the road surface has a friction coefficient lower than the predetermined value in the step of detecting the condition of the road surface.

16. The control method for the electric vehicle according to claim 11, wherein the electric vehicle further includes a power generation device that generates electric power and supplies the generated electric power to the drive device, the control method further comprising:

controlling the power generation device to increase an amount of electric power generated by the power generation device, when it is determined that the road surface has a friction coefficient lower than the predetermined value in the step of detecting the condition of the road surface; and further controlling the power generation device to reduce the amount of electric power generated by the power generation device, when it is determined later that the electric vehicle is slipping in the step of determining whether the electric vehicle is slipping.

17. The control method for the electric vehicle according to claim 11, wherein the step of reducing the torque of the motor includes when it is determined that the electric vehicle is slipping in the step of determining whether the electric vehicle is slipping, reducing the torque of the motor at a rate that is lower than a rate while no slipping is determined in the step of determining whether the electric vehicle is slipping.

18. The control method for the electric vehicle according to claim 11, wherein the electric vehicle further includes a power generation device that generates electric power and supplies the generated electric power to the drive device, and an auxiliary machine that is driven using the electric power generated by the power generation device, the control method further comprising controlling the auxiliary machine to increase an amount of electric power consumed by the auxiliary machine, when it is determined that the electric vehicle is slipping in the step of determining whether the electric vehicle is slipping.

19. The control method for the electric vehicle according to claim 11, wherein the electric vehicle further includes an auxiliary machine that is connected to a drive shaft of the electric vehicle, and driven by the drive shaft, the control method further comprising controlling the auxiliary machine to increase an amount of load applied by the auxiliary machine, when it is determined that the electric vehicle is slipping in the step of determining whether the electric vehicle is slipping.

20. A control method for an electric vehicle including a motor that generates drive power for the electric vehicle, and a drive device that drives the motor, wherein the electric vehicle further includes an auxiliary machine that is connected to a drive shaft of the motor, and driven by the drive shaft, the control method comprising: detecting a condition of a road surface on which the electric vehicle is driven; determining whether the electric vehicle is slipping; controlling the auxiliary machine to increase an amount of load applied by the auxiliary machine, when it is determined that the electric vehicle is slipping; and controlling a voltage input to the drive device to reduce the voltage input to the drive device, when it is determined that the road surface has a friction coefficient lower than a predetermined value in the step of detecting the condition of the road surface, wherein the voltage input to the drive device is reduced by a voltage control device in advance of the auxiliary machine being controlled to increase the amount of load applied by the auxiliary machine, when it is determined that the electric vehicle is slipping.

* * * * *